(12) United States Patent
Lou et al.

(10) Patent No.: US 12,742,917 B2
(45) Date of Patent: Sep. 22, 2026

(54) FIELD LENS AND DISPLAY DEVICE

(71) Applicant: Shanghai Tianma Micro-electronics Co., Ltd., Shanghai (CN)

(72) Inventors: Yanbo Lou, Shanghai (CN); Yang Zeng, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 453 days.

(21) Appl. No.: 18/220,130

(22) Filed: Jul. 10, 2023

(65) Prior Publication Data

US 2024/0219618 A1 Jul. 4, 2024

(30) Foreign Application Priority Data

Dec. 30, 2022 (CN) ......................... 202211736774.1

(51) Int. Cl.
*G02B 5/32* (2006.01)
*G02B 30/26* (2020.01)

(52) U.S. Cl.
CPC ............... *G02B 5/32* (2013.01); *G02B 30/26* (2020.01)

(58) Field of Classification Search
None
See application file for complete search history.

(56) References Cited

U.S. PATENT DOCUMENTS

2020/0409151 A1* 12/2020 Calafiore ........... G02B 27/4272
2022/0091323 A1* 3/2022 Yaroshchuk ....... G02B 6/29304
2022/0137278 A1* 5/2022 Lee ...................... G02B 5/3016 359/489.15
2022/0197026 A1* 6/2022 Grant ................. G02B 27/0018

FOREIGN PATENT DOCUMENTS

CN 212569191 U 2/2021
CN 115685573 A 2/2023
WO WO-2023107309 A1 * 6/2023 ......... G02B 27/0172

* cited by examiner

*Primary Examiner* — Jyotsna V Dabbi
(74) *Attorney, Agent, or Firm* — Anova Law Group, PLLC

(57) ABSTRACT

A field lens and a display device are provided. The field lens includes a lens body and an optical structure. The lens body includes at least two layers of gratings. Along a direction perpendicular to a plane where the lens body is located, the lens body includes a first side and a second side. The optical structure is located on a side of at least one grating layer close to the second side. The optical structure is used to block at least part of the visible light from being incident on one side of the lens body and/or to block at least part of the visible light from being emitted toward the second side of the lens body after being reflected by the gratings.

19 Claims, 19 Drawing Sheets

31

T

FIELD LENS AND DISPLAY DEVICE

CROSS-REFERENCE TO RELATED APPLICATION

This application claims the priority of Chinese Patent Application No. 202211736774.1, filed on Dec. 30, 2022, the content of which is incorporated herein by reference in its entirety.

TECHNICAL FIELD

The present disclosure generally relates to the field of display technology and, more particularly, relates to a field lens and a display device.

BACKGROUND

In a holographic three-dimensional display device, a field lens composed of stacked multi-layer bulk holographic gratings is used to converge light. Each layer of bulk holographic gratings is disposed on a substrate. External natural light is reflected by multi-layer substrates and then transmitted and diffracted by the multi-layer bulk holographic gratings. Since a holographic grating has angle and wavelength selective characteristics, the reflected light of the external natural light by the field lens causes the generation of diffraction fringes and the diffraction fringes show multi-layer messy rainbow fringes, which affects the display effect of the display device.

SUMMARY

One aspect of the present disclosure provides a field lens. The field lens includes a lens body and an optical structure. The lens body includes at least two layers of gratings. Along a direction perpendicular to a plane where the lens body is located, the lens body includes a first side and a second side. The optical structure is located on a side of at least one grating layer close to the second side. The optical structure is used to block at least part of the visible light from being incident on one side of the lens body and/or to block at least part of the visible light from being emitted toward the second side of the lens body after being reflected by the gratings.

Another aspect of the present disclosure provides a field lens. The field lens includes a lens body and an optical structure. The lens body includes at least two layers of gratings. Along a direction perpendicular to a plane where the lens body is located, the lens body includes a first side and a second side; the optical structure is located on a side of at least one grating layer close to the second side. An angle at which the lens body diffracts a first color light ray is $\theta 1$, and an angle at which the optical structure allows the first color light ray to exit is $\alpha 1$, wherein $\alpha 1<\theta 1$. A minimum angle at which the lens body diffracts the first color light ray is A1, wherein $\alpha 1<A1$ Another aspect of the present disclosure provides a display device. The display device includes a field lens. The field lens includes a lens body and an optical structure. The lens body includes at least two layers of gratings. Along a direction perpendicular to a plane where the lens body is located, the lens body includes a first side and a second side. The optical structure is located on a side of at least one grating layer close to the second side. The optical structure is used to block at least part of the visible light from being incident on one side of the lens body and/or to block at least part of the visible light from being emitted toward the second side of the lens body after being reflected by the gratings.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
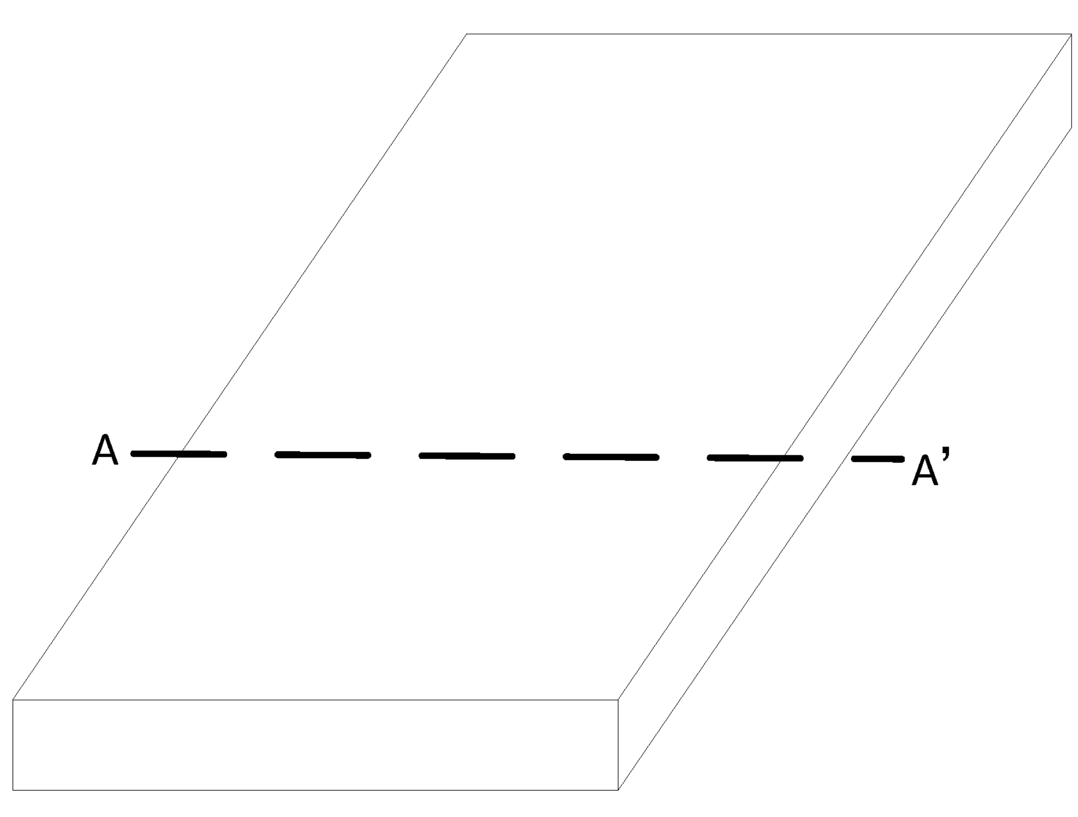
FIG. 1 illustrates an exemplary field lens consistent with various disclosed embodiments of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like components, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and are not intended to limit the scope of the disclosure. Furthermore, a three-dimensional (3D) size including length, width, and depth should be considered during practical fabrication.

In a holographic three-dimensional display device, a field lens composed of stacked multi-layer bulk holographic gratings is used to converge light. Each layer of bulk holographic gratings is disposed on a substrate. External natural light is reflected by multi-layer substrates and then transmitted and diffracted by the multi-layer bulk holographic gratings. Since a holographic grating has angle and wavelength selective characteristics, the reflected light of the external natural light by the field lens causes the generation of diffraction fringes and the diffraction fringes show multi-layer messy rainbow fringes, which affects the display effect of the display device.

The present disclosure provides a field lens and a display device, to at least partially alleviate the influence of the diffraction fringes on the display effect.

Figure 2:
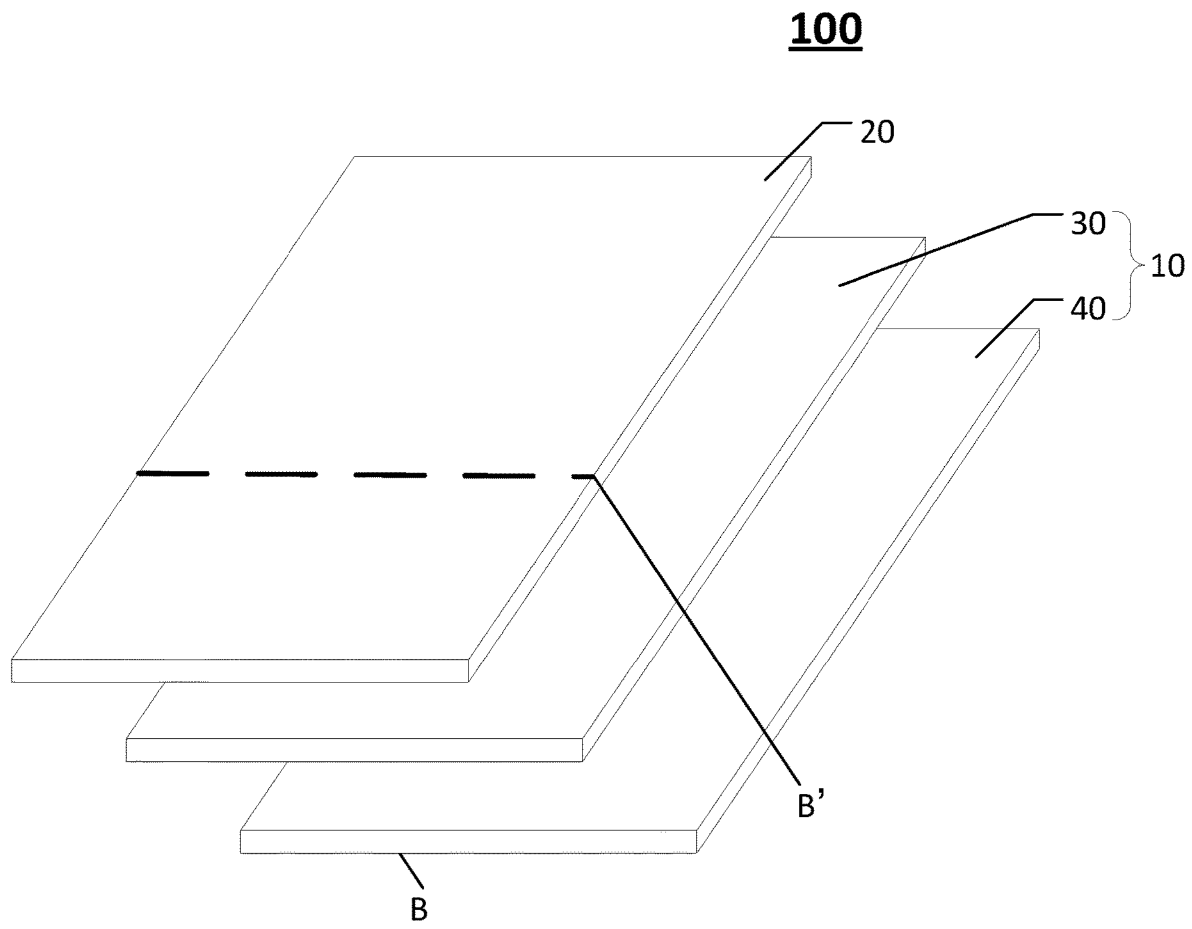
FIG. 2 illustrates a stereoscopic view of an exemplary field lens consistent with various disclosed embodiments of the present disclosure.
Figure 3:
FIG. 3 illustrates a cross-sectional view of the field lens in FIG. 2 along a BB' direction, consistent with various disclosed embodiments of the present disclosure.
Figure 3:
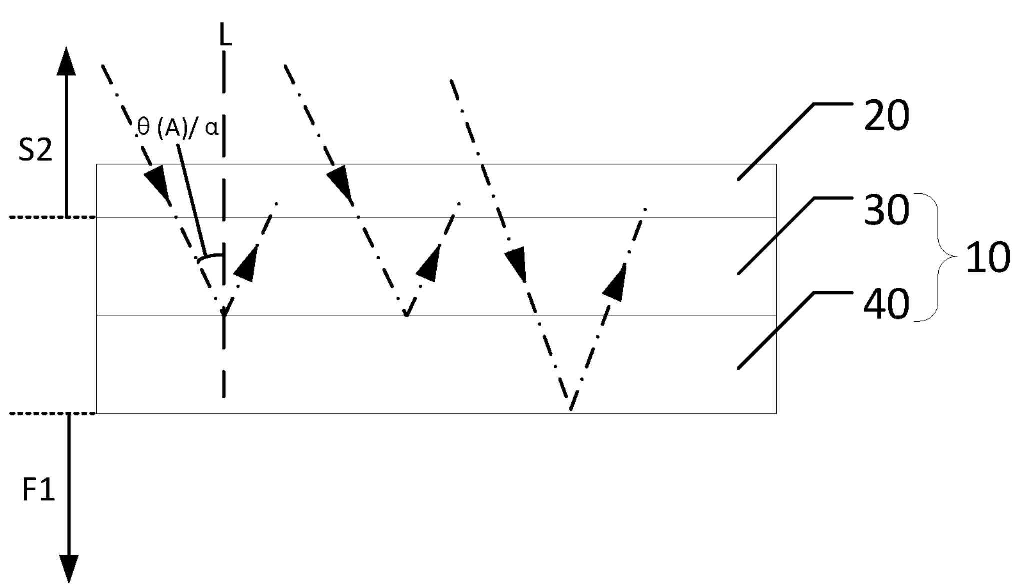

One aspect of the present disclosure provides a field lens. As shown in FIG. 1 illustrating an exemplary field lens, FIG. 2 illustrating a stereoscopic view of the field lens, and FIG. 3 showing a cross-sectional view of the field lens in FIG. 2 along a BB' direction, in one embodiment of the present disclosure, the field lens 100 may include a lens body 10 and an optical structure 20.

The lens body 10 may include at least two layers of gratings (30/40). Along a direction perpendicular to a plane where the lens body 10 is located, the lens body 10 may include a first side F1 and a second side S2. The optical structure 20 may be located on a side of at least one layer of gratings (30/40) close to the second side S2.

The optical structure 20 may be configured to block at least part of the visible light from being incident on a side of the lens body 10 and/or to block at least part of the visible light from emitting to the second side S2 of the lens body 10 after being reflected by the gratings 30/40.

Specifically, the present embodiment provides a field lens 100. The field lens 100 may include the lens body 10 and the optical structure 20. The lens body 10 may include two or more layers of gratings (30/40), and each layer of gratings (30/40) may further include a substrate (not shown) which may be made of glass. That is, a grating (30/40) may be formed on a glass substrate. In some other embodiments, the substrate may also be made of other materials and the present disclosure does not specifically limit this. Along the direction perpendicular to the plane where the lens body 10 is located, the lens body 10 may include the first side F1 and the second side S2. The first side F1 may be used for receiving display light and the second side S2 may be a side where the light is emitted. The second side S2 may also have a situation that external light (visible light) enters it. In one embodiment, the optical structure 20 may be disposed at a side of the at least one layer of gratings 30/40 close to the second side S2, as shown in FIG. 3. In some other embodiments, the optical structure 20 may be disposed at the second side S2 of the whole lens body 10.

When external light (visible light) is irradiated from the second side S2 of the lens body 10 to the first side F1, the substrates corresponding to the gratings (30/40) in the lens body 10 may reflect the external light. Especially, when glass is used to form the substrates, the reflection of the glass substrates to the external light may be more obvious. In the present disclosure, the optical structure 20 may be configured to block the incidence of part of the visible light on a side of the lens body 10, and/or to block at least part of the light reflected by the glass substrates of the gratings (30/40) to the second side S2. Correspondingly, the amount of visible light that is reflected by the gratings (30/40) and then emitted to the second side S2 of the lens body 10 may be reduced, thereby reducing the amount of diffraction fringes on the second side S2 of the lens body 10 that are able to be observed by users and weakening the influence of diffraction fringes on the display effect.

It should be noted that the optical structure 20 added in the field lens 100 may be arranged on the second side S2 of the entire lens body 10, or it may be arranged on a side of any layer of the gratings (30/40) in the lens body 10 close to the second side S2, or it may be arranged on sides of at least two different gratings (30/40) include the optical structure 20 close to the second side S2. The present disclosure has no limit on the number and the position of the optical structures 20 included in the field lens 100, and the users may adjust the setting position and setting quantity of the optical structures 20 according to actual needs, as long as the optical structures 20 are able to be set to reduce the amount of visible light incident on the lens body 10, and/or reduce the amount of visible light emitted to the second side of the lens body 10 after being reflected by the substrates to reduce the amount of diffraction fringes. As long as the optical structure 20 is arranged on a side of any grating (30/40) close to the second side S2, the amount of visible light received by any grating (30/40) on the first side F1 of the optical structure 20 may be reduced, and/or the amount of reflected visible light may be reduced. Then, the amount of the visible light emitted from the second side S2 of the lens body 10 after being reflected may be reduced, such that the number of diffraction fringes on the second side S2 of the field lens 100 may be reduced. Therefore, the influence of diffraction fringes on the display effect may be reduced to a certain extent, and the display effect of the related display device may be improved.

As shown in FIG. 3, in one embodiment, the angle at which the lens body 10 diffracts visible light may be θ, and the angle at which the optical structure 20 allows visible light to exit may be α, where α<θ.

It should be noted that the angle θ at which the lens body 10 diffracts visible light may be the angle at which diffraction will occur in the angle formed between the light and the normal line L when the light is emitted to a side of the lens body 10. The angle α at which the optical structure 20 allows visible light to exit may be the angle at which the visible light is allowed to exit in the angle formed by the light and the normal line L when the light is emitted to the side of the lens body 10. Specifically, in one embodiment, it may be configured that the angle θ at which the lens body 10 diffracts visible light emitted from the second side S2 to the first side F1 and the angle α at which the optical structure 20 allows visible light to exit meet α<θ. Therefore, the light emitted to the second side S2 of the lens body 10 after being reflected by the gratings (30/40) in the lens body 10 may be blocked by the optical structure 20. Correspondingly, when the visible light irradiates the lens body 10 from the second side S2 of the lens body 10, the visible light may not be able to emit toward the second side S2 of the lens body 10 after being reflected by the gratings (30/40) in the lens body 10. That is, there may be no diffracted light on the second side S2 of the lens body 10. Therefore, the influence of the diffraction fringes on the display effect may be eliminated, and the display effect of the related display device may be improved.

As shown in FIG. 3, in one embodiment, a minimum angle at which the lens body 10 diffracts visible light may be A, and α<A.

It should be noted that the minimum angle A at which visible light is diffracted by the lens body 10 may be a minimum angle at which diffraction will occur among angles formed between the light and the normal line L when the light exits toward a side of the lens body 10. Specifically, in one optional embodiment of the present disclosure, the minimum angle at which the lens body 10 diffracts visible light may be A. As long as the optical structure 20 is set to allow the visible light to exit at an angle smaller than A, the light emitted to the second side S2 of the lens body 10 after being reflected by the grating (30/40) may be blocked by the optical structure 20. When the visible light is irradiated from the second side S2 of the lens body 10 to the lens body 10, the visible light may not be able to exit toward the second side of the lens body 10 after being reflected by the grating (30/40) in the lens body 10. That is, no diffracted light may appear on the second side S2 side of the lens body 10, which may eliminate the influence of the diffraction fringes on the display effect. The display effect of the related display device may be improved.

Figure 4:
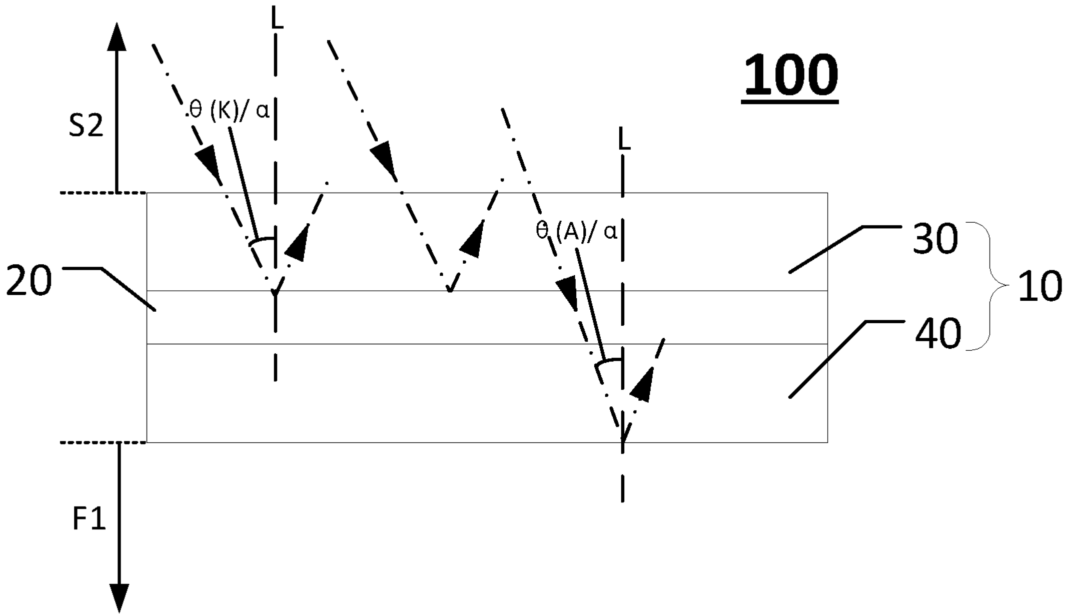
FIG. 4 illustrates a cross-sectional view of the field lens in FIG. 1 along an AA' direction, consistent with various disclosed embodiments of the present disclosure.

FIG. 4 shows a cross-sectional view of AA' in FIG. 1 provided by one embodiment of the present disclosure. As shown in FIG. 3 and FIG. 4, the minimum angle A at which the first grating 40 diffracts visible light may be a minimum angle at which diffraction will occur among angles formed between the light and the normal line L corresponding to the substrate of the first grating 40 when the light exits toward a side of the lens body 10. The minimum angle K at which the second grating 30 diffracts visible light may be a minimum angle at which diffraction will occur among angles formed between the light and the normal line L corresponding to the substrate of the second grating 30 when the light exits toward a side of the lens body. In one optional embodiment, the lens body 10 may include the first grating 40 and the second grating 30 arranged in sequence along the direction from the first side F1 to the second side S2. The minimum angle at which the first grating 40 diffracts visible light may be A, and the minimum angle at which the second grating 30 diffracts visible light may be K. As shown in FIG. 4, when the optical structure 20 is arranged between the first grating 40 and the second gratings 30, the optical structure 20 may be configured to only block the light reflected by the first grating 40 from exiting toward the second side S2 of the lens body 10, which may be realized by only setting the angle α at which the optical structure 20 allows the visible light to exit to be smaller than A. As shown in FIG. 3, when the optical structure 20 is arranged on the side of the second grating 30 away from the first grating 40 and the angle α at which the optical structure 20 allows the visible light to exit to be smaller than K, it may only prevent the light reflected by the second grating 30 from exiting toward the second side S2 of the lens body 10, and it may only block part of the light reflected by the first grating 40 from exiting toward the second side S2 of the lens body 10. To block the light reflected by the first grating 40 and the second grating 30 from exiting toward the second side S2 of the lens body 10 at the same time, the angle at which the optical structure 20 allows visible light to exit may be configured to be smaller than A. Since A is smaller than K, setting α<K may only block part of the reflected light from exiting toward the second side S2 of the lens body 10. Setting α<A may block all reflected light from exiting toward the second side S2 of the lens body 10. That is, as long as the optical structure 20 is able to block the diffracted light at the minimum angle at which the visible light will be diffracted from exiting, it may also be able to block other light after being reflected by the grating from exiting toward the second side S2 of the lens body 10.

Figure 5:
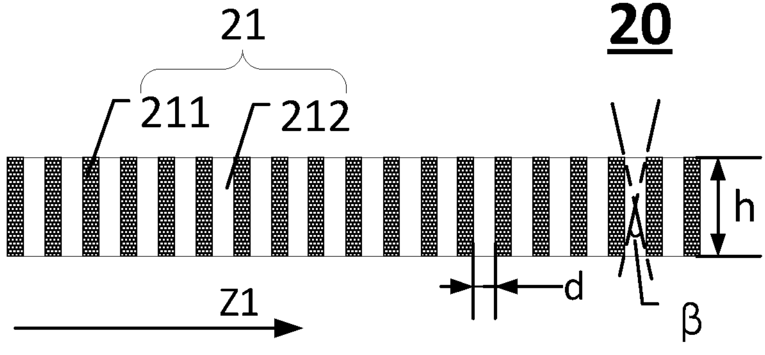
FIG. 5 illustrates an exemplary optical structure consistent with various disclosed embodiments of the present disclosure.

FIG. 5 is a schematic structural view of an optical structure provided by one embodiment of the present disclosure. As shown in FIG. 3 to FIG. 5, in one embodiment, the optical structure 20 may include a light confinement layer 21, and the light confinement layer 21 may include a plurality of light-shielding components 211 and a plurality of light-transmitting components 212 arranged alternately along a first direction Z1. The first direction Z1 may be perpendicular to the first side F1 toward the second side S2.

Specifically, in the present embodiment, the optical structure 20 may include the light confinement layers 21. The light confinement layer 21 may include the plurality of light-shielding components 211 and the plurality of light-transmitting components 212. The plurality of light-shielding components 211 and the plurality of light-transmitting components 212 may be arranged alternately along a direction perpendicular to the first side F1 and toward the second side S2. The plurality of light shielding components 211 may be used to block part of the incident light entering the first side F1 through the second side S2 of the lens body 10, and/or the plurality of light shielding components 211 may be used to block the light entering the first side F1 through the second side S2 of the lens body 10 from exiting toward the second side S2 after being reflected by the grating (30/40) in the lens body 10, to reduce the number of diffraction fringes on the second side S2 of the lens body 10 and improve the display effect of the relevant display device. The plurality of light-transmitting parts 212 may be used for the transmission of the display light of the first side F1 of the lens body 10, to ensure the normal display function of the relevant display device and prevent the light confinement layer 21 from affecting the normal display effect of the related display device.

As shown in FIG. 3 to FIG. 5, optionally, a portion of spacing d between adjacent light-shielding components 211 may be configured to be same, and height h of a portion of the plurality of light-shielding components 211 may be configured to be same along the direction from the first side F1 to the second side S2.

Specifically, in one embodiment, the optical structure 20 may include the light confinement layers 21. The light confinement layer 21 may include the plurality of light-shielding components 211 and the plurality of light-transmitting components 212. The plurality of light-shielding components 211 and the plurality of light-transmitting components 212 may be arranged alternately along a direction perpendicular to the first side F1 and toward the second side S2. A portion of the spacing d between adjacent light-shielding components 211 of the plurality of light-shielding components 211 may be configured to be same, and the height h of a portion of the plurality of light-shielding components 211 may be configured to be same along the direction from the first side F1 to the second side S2. In some embodiments, the spacing d between any adjacent light-shielding components 211 of the plurality of light-shielding components 211 may be configured to be same, and the height h of all of the plurality of light-shielding components 211 in the optical confinement layer 21 may be configured to be same along the direction from the first side F1 to the second side S2.

As shown in FIG. 3 to FIG. 5, in one embodiment, the spacing between adjacent light-shielding components 211 of the plurality of light-shielding components 211 may be d, and the height of one of the plurality of light-shielding components along the direction from the first side F1 to the second side S2 may be h, and the angle at which the optical structure 20 allows visible light to exit may be $\alpha$, where $\alpha=(1/2)*\arctan(h/d)$.

Since the height h and spacing d of the light shielding parts 211 may control the size of the viewing angle $\beta$ of the light emitted from the first side F1 to the second side S2, in the case of the same height h, the smaller the spacing d is, the smaller the viewing angle $\beta$ will be. When d is large, the viewing angle $\beta$ will be relatively larger. When the spacing d is equal, the viewing angle $\beta$ may be relatively large if the height h is small, and the viewing angle $\beta$ will be relatively small if the height h is large. Therefore, by setting all of the plurality of light-shielding components 211 in the light confinement layer 21 to have the same height h and spacing d, uniform control of the viewing angle $\beta$ of the light emitted from the first side F1 to the second side S2 of the light confinement layer 21 may be achieved. The angle $\alpha$ at which the optical structure 20 allows visible light to exit may be the angle at which visible light is allowed to exit among angles formed between the light and the normal line L when the light exits toward the side of the lens body 10. Therefore, the value of the angle $\alpha$ may be configured to ½ of the view angle $\beta$.

The value of a may be adjusted by adjusting d and h. Therefore, in one embodiment, any d in the light confinement layer 21 may be set to be equal, and any h may be set to be equal. That is, the spacing d between any adjacent light-shielding components 211 of the plurality of light-shielding components 211 may be configured to be same, and the height h of all of the plurality of light-shielding components 211 in the optical confinement layer 21 may be configured to be same along the direction from the first side F1 to the second side S2. Correspondingly, the angle at which the optical structure 20 allows visible light to exit may be calculated by $\alpha=(1/2)*\arctan(h/d)$. The angle $\alpha$ at which the optical structure 20 allows visible light to exit may be equivalent to ½ of the above-mentioned viewing angle $\beta$. It can also be seen from the above formula that, when h is constant, the viewing angle $\beta$ will be smaller when the spacing d is smaller and the viewing angle $\beta$ will be larger when the spacing d is larger. When d is constant, the viewing angle $\beta$ will be larger when the height h is smaller and the viewing angle $\beta$ will be smaller when the height h is larger. In one optional embodiment, the spacing d may range from 100 μm to 1 mm. When the spacing d is larger than 1 mm, the amount of light that can be blocked may be greatly reduced, making it difficult to achieve the desired effect of reducing the diffraction fringes. When the spacing d is less than 100 μm, the display light may not normally pass through the optical structure 20 and exit to the user side, and the user cannot see the desired display image, which affects the display effect of the corresponding display device.

Figure 6:
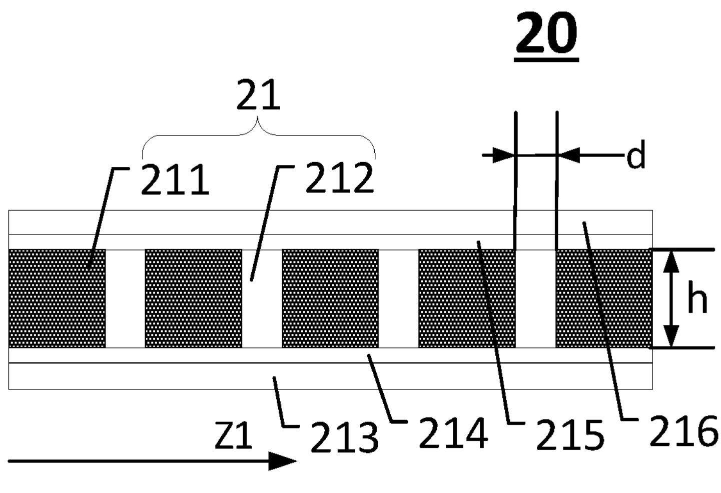
FIG. 6 illustrates another exemplary optical structure consistent with various disclosed embodiments of the present disclosure.

In one embodiment, the light confinement layer 21 may be embodied as a louver structure, and the spacing d may be distance between the slats in the louver, and the height h may be the thickness of the louver. FIG. 6 is another structural schematic diagram of the optical structure provided by one embodiment of the present application. As shown in FIG. 3, FIG. 4, and FIG. 6, in addition to the light confinement layer 21, the optical structure 20 may further include a polyethylene terephthalate (PET) layer 213 disposed on a side of the light confinement layer 21 facing the first side F1, and the PET layer 213 may be bonded to the light confinement layer 21 through an adhesive 214. The optical structure 20 may further include a polycarbonate (PC) layer 215 disposed on a side of the light confinement layer 21 facing the second side S2, and an anti-glare hard coating 216 disposed on the side of the PC layer 215 away from the light confinement layer 21. The display effect of the corresponding display device may be improved.

In various embodiments, the plurality of light shielding components 211 in the light confinement layer 21 may have the shape of a sheet as shown in FIG. 5 or have the shape of a block as shown in FIG. 6, which is not specifically limited in the present disclosure.

As shown in FIG. 5 and FIG. 6 in conjunction with FIG. 3 and FIG. 4, optionally, the plurality of light shielding components 211 may be made of a light-absorbing material.

Specifically, the plurality of light shielding components 211 in the light confinement layer 21 may be made of a light-absorbing material. The plurality of light shielding components 211 made of a light-absorbing material may block the incident and outgoing paths of light, and absorb the light irradiated on the surface of t the plurality of light shielding components 211 to avoid the re-reflection of part of the light. Therefore, the blocking effect of the light confinement layer 21 on part of the visible light incident on the lens body 10 may be improved, and a specific blocking effect of the light confinement layer 21 on the diffracted light reflected by the grating (30/40) in the lens body 10 toward the second side S2 of the lens body 10 may be provided, to realize reduction or elimination of the diffraction fringes. The display effect of related display devices may be improved. Further, the plurality of light-transmitting components 212 in the light confinement layer 21 may not be filled with any material, and may directly appear as hollow parts, to avoid the influence of the filling material on the light transmittance of the plurality of light-transmitting components 212. In some other embodiments, some filling materials with very high light transmittance may be filled in the plurality of light-transmitting components 212, to avoid voids in the light confinement layer 21 and improve the structural stability of the light confinement layer 21.

Figure 7:
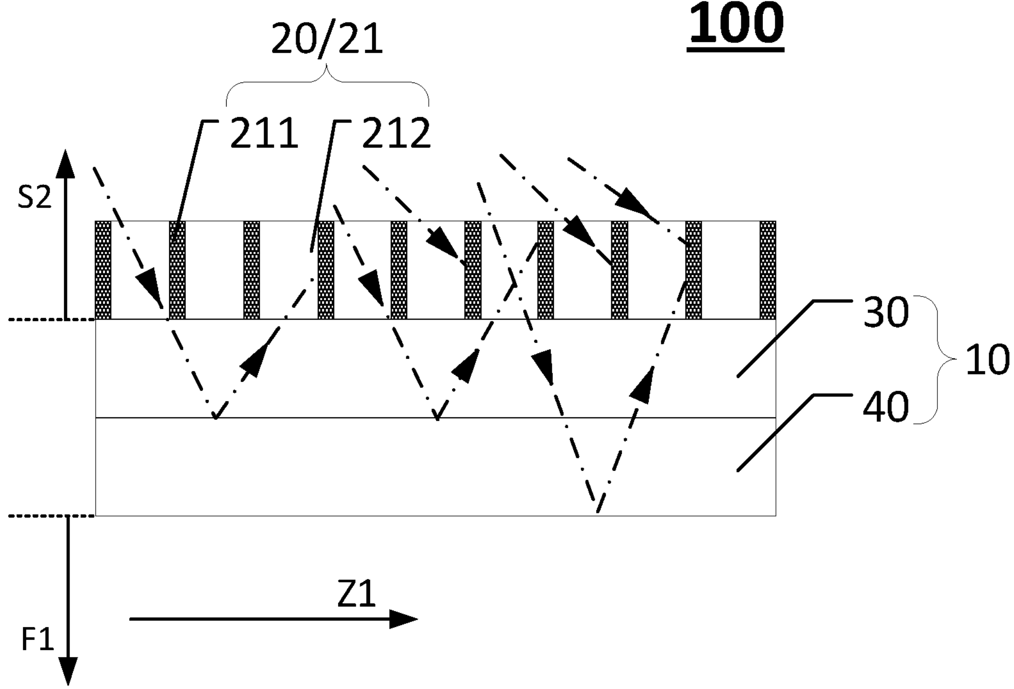
FIG. 7 illustrates another cross-sectional view of the field lens in FIG. 2 along the BB' direction, consistent with various disclosed embodiments of the present disclosure.

As shown in FIG. 2, FIG. 5, and FIG. 7 which shows another cross-sectional view along the BB' direction in FIG. 2, in one embodiment, a plane of at least one light-shielding component 211 of the plurality of light-shielding components 211 may be perpendicular to a plane of at least one grating (30/40).

Specifically, in the present embodiment, the optical structure 20 may include the light confinement layers 21. The light confinement layer 21 may include the plurality of light-shielding components 211 and the plurality of light-transmitting components 212. The plurality of light-shielding components 211 and the plurality of light-transmitting components 212 may be arranged alternately along a direction perpendicular to the first side F1 and toward the second side S2. Planes where at least a portion of the plurality of light-shielding components 211 is located may be configured to be perpendicular to the plane where the grating (30/40) is located. When the planes of the plurality of light-shielding components 211 is located are not perpendicular to the plane where the grating (30/40) is located, although part of the visible light incident toward a side of the lens body 10 may be blocked and/or the light irradiated to the surfaces of plurality of light-shielding components 211 after being reflected by the grating 30/40 may be blocked to reduce the number of diffraction fringes, part of the light used for display may also be blocked at the same time, which will affect the display effect of the corresponding display device. Therefore, in the present embodiment, the planes where all t plurality of light-shielding components 211 in the light confinement layer 21 are located may be set to be perpendicular to the plane where the grating (30/40) is located. On this basis, the space between any two adjacent light-shielding components of the plurality of light-shielding components 211 may be configured to be d, and the height of any one of the plurality of light-shielding components 211 may be configured to be h, to achieve the uniform control on the viewing angle of the light emitted from the first side F1 of the light confinement layer 21 to its second side S2.

Since the light confinement layer 21 includes the plurality of light-shielding components 211, the light that incident on the surfaces of the plurality of light-shielding components 211 from any direction may be blocked. For example, when some light with relatively large incident angles is incident from the outside (the second side S2) on the side of the light confinement layer 20, it may be blocked and absorbed by the plurality of light-shielding components 211, thereby avoiding the incidence of the large-angle light on the side of the lens body 10. Correspondingly, this light may not be reflected by the substrates of the first grating 40 and the second grating 3, to reduce the number of diffraction fringes formed after the incident light is reflected by the substrates of the first grating 40 and the second grating 30 and improve the display effect of the related display device.

As shown in FIG. 7, in one embodiment, along the direction from the first side F1 to the second side S2, the lens body 10 may include a pre-deflection grating 40 and a converging grating 30 arranged in layers.

Specifically, in the present embodiment, the lens body 10 may include the pre-deflection grating 40 and the converging grating 30 stacked in layers along the direction from the first side F1 of the lens body 10 to the second side S2. The pre-deflection grating 40 may be used for the pre-deflection of the display laser emitted by the display light source on the first side F1 of the lens body 10, and the converging grating 30 may be used for the converging of the display laser emitted by the display light source on the first side F1 of the lens body 10. The cooperation of the pre-deflection grating 40 and the converging grating 30 may realize the converging of the modulated display laser, to realize the display function of the display laser on the second side S2 of the lens body 10.

The present disclosure does not specifically limit the number of pre-deflection gratings 40 and converging gratings 30 included in the lens body 10, and users may adjust the number of pre-deflection gratings 40 and converging gratings 30 included in the lens body 10 according to their needs.

The converging grating 30 may act as a lens. Different from a conventional lens, in the converging grating 30, when the converging grating includes a plurality of converging sub-gratings, each one of the plurality of converging sub-gratings may be used to only converge light of one wavelength. There is light incident on the converging grating 30 in the direction perpendicular to the plane where the converging grating 30 is located, the converging effect of the converging grating 30 on such light may be not good. The pre-deflection grating 40 may be configured to deflect this light with a small angle first, and then the converging grating 30 may be used to realize the converging of the light, which may improve the converging effect of the lens body 10 on the light.

As shown in FIG. 7, in one embodiment, the optical structure 20 may be located on a side of the converging grating 30 away from the pre-deflection grating 40.

Specifically, in the present embodiment, when the lens body 10 includes the pre-deflection grating 40 and the converging grating 30, the optical structure 20 may be arranged on the side of the converging grating 30 away from the pre-deflection grating 40. Correspondingly, along the direction from the first side F1 of the lens body 10 to the second side S2, the film layer structure of the lens body 10 and the optical structure 20 may be sequentially arranged as the pre-deflection grating 40, the converging grating 30, and the optical structure 20. When there is light incident from the second side S2 of the lens body 10 on the side of the lens body 10, part of the incident light may be blocked by the optical structure 20, and/or part of the incident light may be reflected by the converging grating 30 and then be reflected by the pre-deflection grating 40. The optical structure 20 may have a certain shading effect on the light reflected by the pre-deflection grating 40 and the converging grating 30, thereby reducing the number of diffraction fringes appearing on the second side S2 of the lens body 10 and improving the display of the related display device.

Figure 8:
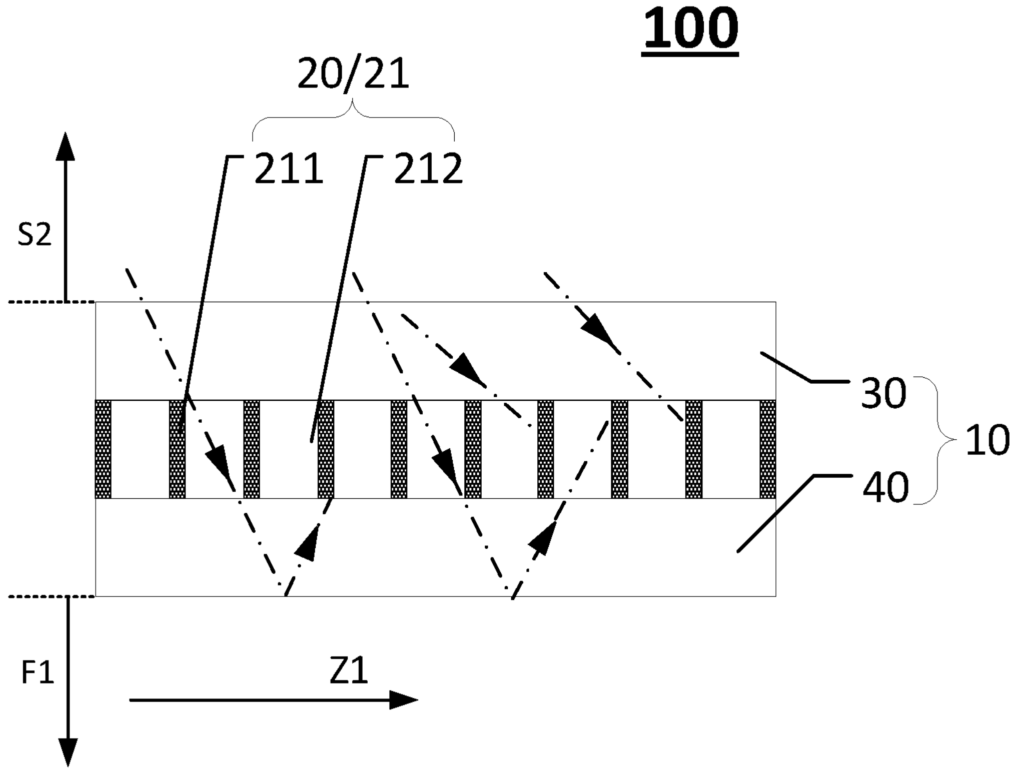
FIG. 8 illustrates another cross-sectional view of the field lens in FIG. 1 along the AA' direction, consistent with various disclosed embodiments of the present disclosure.

As shown in FIG. 1, FIG. 5, and FIG. 8 which is another cross-sectional view along the AA direction in FIG. 1, in another embodiment, the optical structure 20 may be located between the converging grating 30 away from the pre-deflection grating 40.

Specifically, in the present embodiment, when the lens body 10 includes the pre-deflection grating 40 and the converging grating 30, the optical structure 20 may be arranged between the converging grating 30 away from the pre-deflection grating 40. Correspondingly, along the direction from the first side F1 of the lens body 10 to the second side S2, the film layer structure of the lens body 10 and the optical structure 20 may be sequentially arranged as the pre-deflection grating 40, the optical structure 20, and the converging grating 30. When there is light incident from the second side S2 of the lens body 10 to the first side F1 of the lens body 10, the optical structure 20 may block part of the light from being incident on the pre-deflection grating 40. Further, the pre-deflection grating 40 of the lens body 10 may reflect the light incident on the pre-deflection grating 40 from the second side S2 of the lens body 10. Correspondingly, in the present embodiment, the optical structure 20 may be disposed on a side of the pre-deflection grating 40 facing the converging grating 30, and may be also configured to block the light reflected by the pre-deflection grating 40 to a certain degree. The optical structure 20 may reduce the light emitted to the second side S2 after being reflected by the pre-deflection grating 40, thereby reducing the number of diffraction fringes appearing on the second side S2 of the lens body 10 and improving the display of the related display device.

When the lens body 10 includes the stacked converging grating 30 and the pre-deflection grating 40, the diffraction fringes may be mainly caused by the specular reflection of the light incident from the second side S2 of the lens body 10 by the pre-deflection grating 40. Therefore, for the light to be blocked by the optical structure 20, the optical structure 20 may be mainly used to block the light reflected by the pre-deflection grating 40. Of course, the optical structure 20 may also be used to block the light reflected by the converging grating 30, and the present disclosure has no limit on this. The user may choose the installation position of the optical structure 20 according to his own needs, so as to reduce the diffraction fringes appearing on the second side S2 of the lens body 10.

Figure 9:
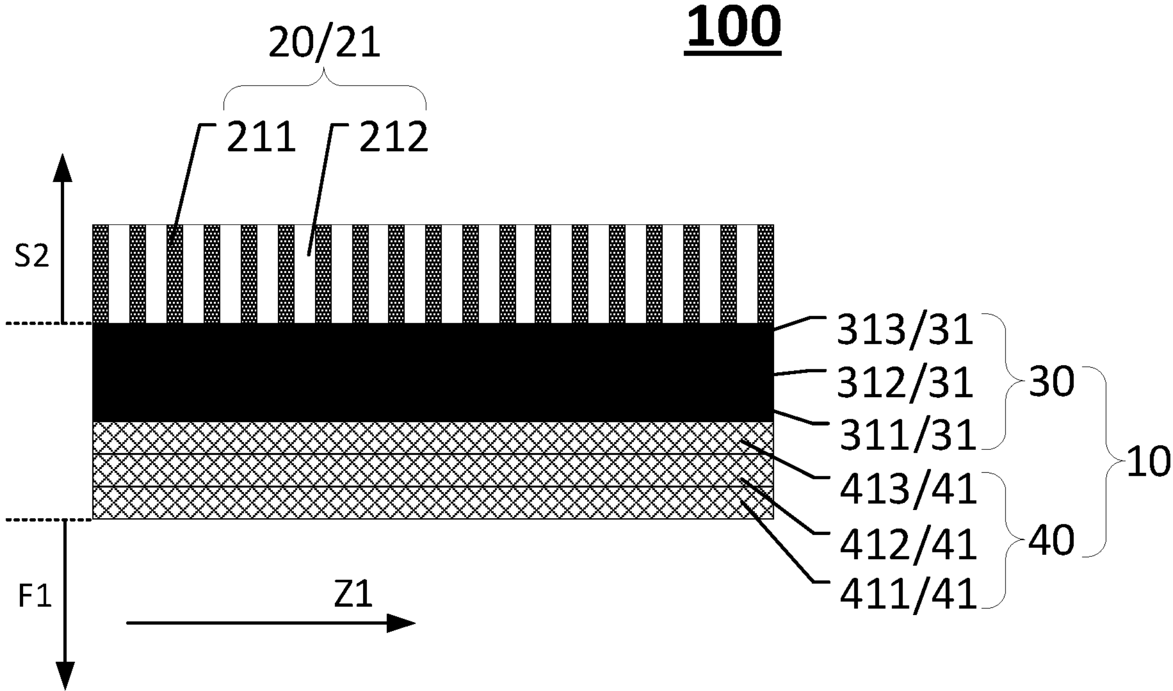
FIG. 9 illustrates another cross-sectional view of the field lens in FIG. 2 along the BB' direction, consistent with various disclosed embodiments of the present disclosure.

As shown in FIG. 2, FIG. 7, and FIG. 9 which is another cross-sectional view along the BB' direction in FIG. 2, in another embodiment, along the direction from the first side F1 to the second side S2, the converging grating 30 may include a plurality of converging sub-gratings 31 stacked in layers, and the plurality of converging sub-gratings 31 may include a first converging sub-grating 311, a second converging sub-grating 312, and a third 313.

Along the direction from the first side F1 to the second side S2, the pre-deflection grating 40 may include a plurality of pre-deflection sub-gratings 41 stacked in layers, and the plurality of pre-deflection sub-gratings 41 may include a first pre-deflection sub-grating 411, a second pre-deflection sub-grating 412, and a third pre-deflection sub-grating 413.

Specifically, in the present embodiment, along the direction from the first side F1 to the second side S2, the converging grating 30 in the lens body 10 may include two or more layers of converging sub-gratings 31. For example, in one embodiment, the converging grating 30 may include three layers of converging sub-gratings 31, specifically the first converging sub-grating 311, the second converging sub-grating 312, and the third converging sub-grating 313. Also, along the direction from the first side F1 to the second side S2 of the lens body 10, the pre-deflection grating 40 in the lens body 10 may include two or more layers of pre-deflection sub-gratings 41. For example, in one embodiment, the pre-deflection grating 40 may include three layers of pre-deflection sub-gratings, specifically, the first pre-deflection sub-grating 411, the second pre-deflection sub-grating 412, and the third pre-deflection sub-grating 413.

Figure 10:
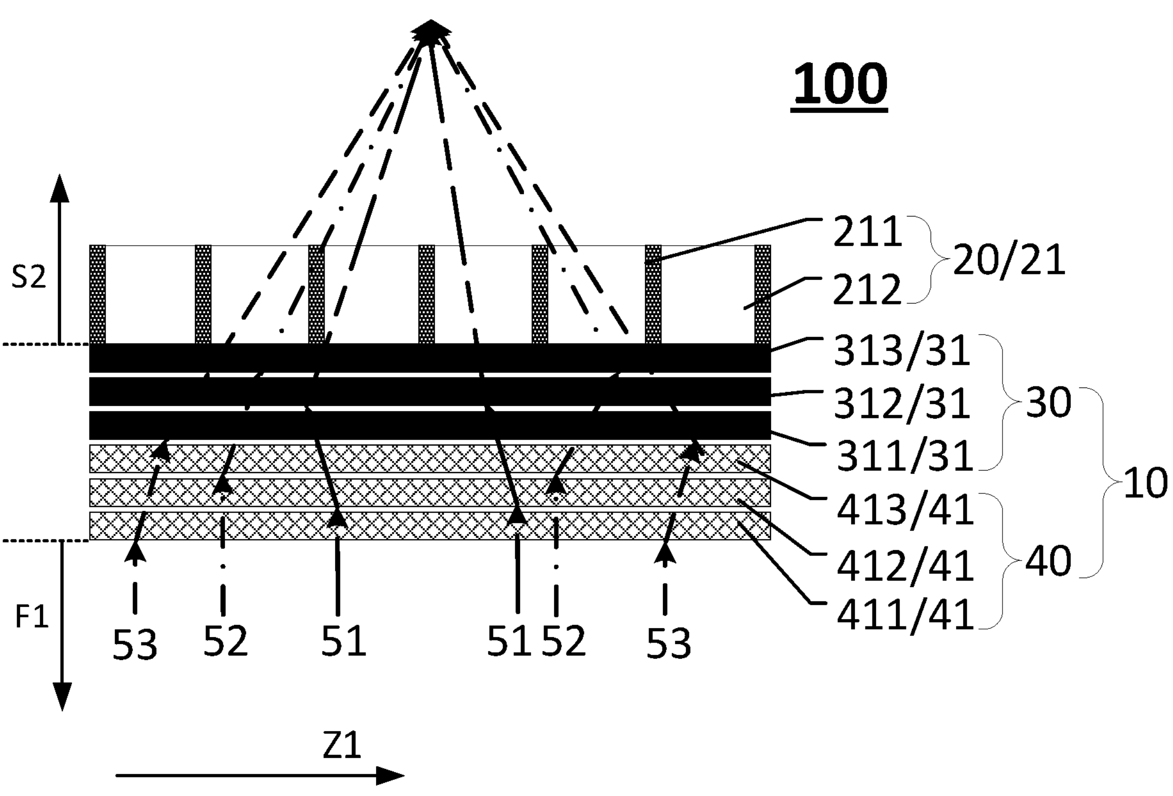
FIG. 10 illustrates another cross-sectional view of the field lens in FIG. 2 along the BB' direction, consistent with various disclosed embodiments of the present disclosure.

As shown in FIG. 2 and FIG. 10 which is another cross-sectional view along the BB' direction in FIG. 2, the pre-deflection grating 40 may be able to be used for the pre-deflection of the display laser emitted by the display light source on the first side F1 of the lens body 10, the converging grating 30 may be used for the converging of the display laser emitted by the display light source on the first side F1 of the lens body 10. The cooperation of the pre-deflection grating 40 and the converging grating 30 may realize the converging of the modulated display laser, to realize the display function of the display laser on the second side S2 of the lens body 10. When the display laser includes three different colors, one of the plurality of pre-deflection sub-grating 41 and one of the plurality of converging sub-gratings 31 may be used for converging and displaying the display laser light of one of the three colors, and the display laser light of the other two colors may be converged and displayed through the other two pre-deflection sub-gratings 41 and the converging sub-gratings 31.

Figure 11:
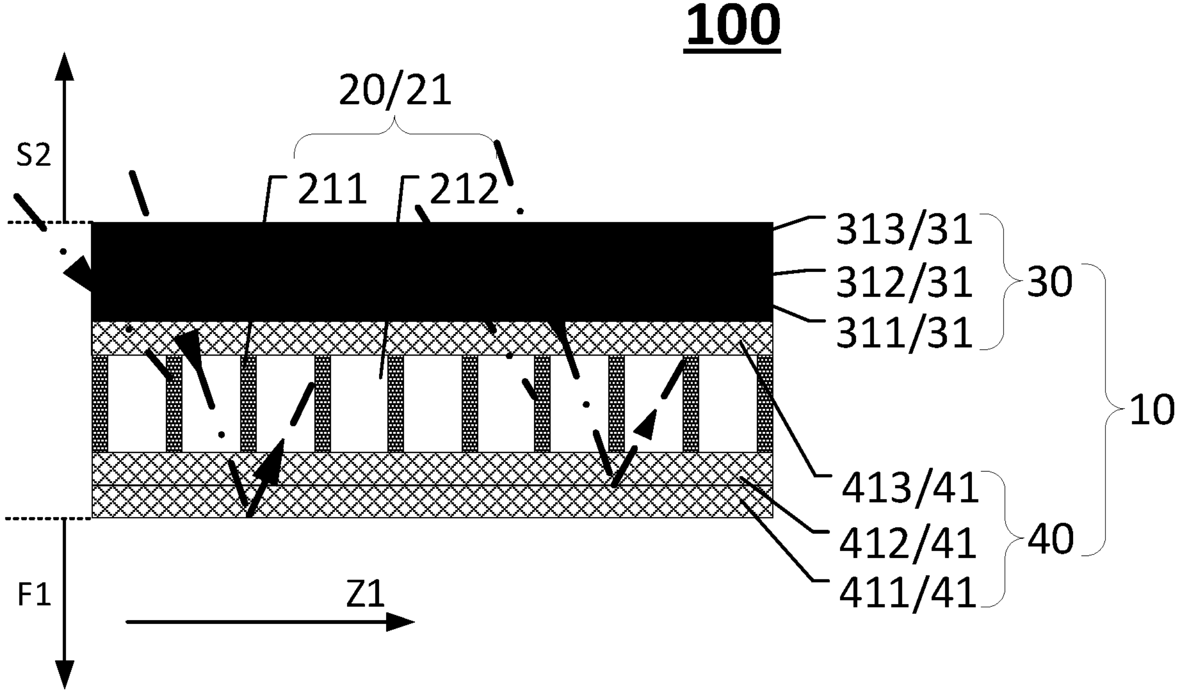
FIG. 11 illustrates another cross-sectional view of the field lens in FIG. 1 along the AA' direction, consistent with various disclosed embodiments of the present disclosure.

As shown in FIG. 1 and FIG. 11 which is another cross-sectional view along the AA' direction in FIG. 1, the optical structure 20 may be disposed between two adjacent pre-deflection sub-gratings 41.

Specifically, in the present embodiment, when the lens body 10 includes two or more layers of pre-deflection sub-gratings 41, the optical structure 20 may be disposed between two adjacent pre-deflection sub-gratings 41. For example, as shown in FIG. 11, the pre-deflection grating 40 may include the first pre-deflection sub-grating 411, the second pre-deflection sub-grating 412, and the third pre-deflection sub-grating 413 disposed sequentially from the first side F1 to the second side S2 of the lens body 10, the optical structure 20 may be disposed between the second pre-deflection sub-grating 412 and the third pre-deflection sub-grating 413. Therefore, the optical structure 20 may be used to block part of the visible light from being incident on a side of the first pre-deflection sub-grating 411 and a side of the second pre-deflection sub-grating 412. And/or, the optical structure 20 may be used to block part of the visible light emitted toward the second side S2 of the lens body 10 after being reflected by the first pre-deflection sub-grating 411 and the second pre-deflection sub-grating 412, thereby reducing the number of diffraction fringes appearing on the second side S2 of the lens body 10 and improving the display of the related display device.

Figure 12:
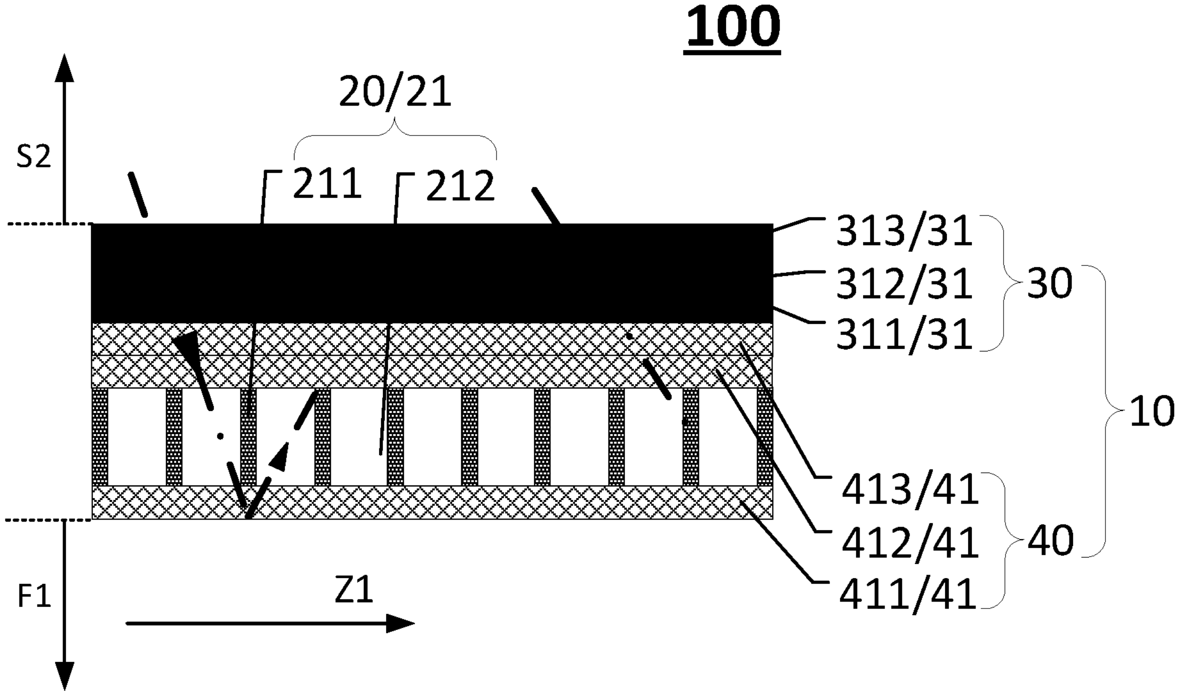
FIG. 12 illustrates another cross-sectional view of the field lens in FIG. 1 along the AA' direction, consistent with various disclosed embodiments of the present disclosure.
Figure 13:
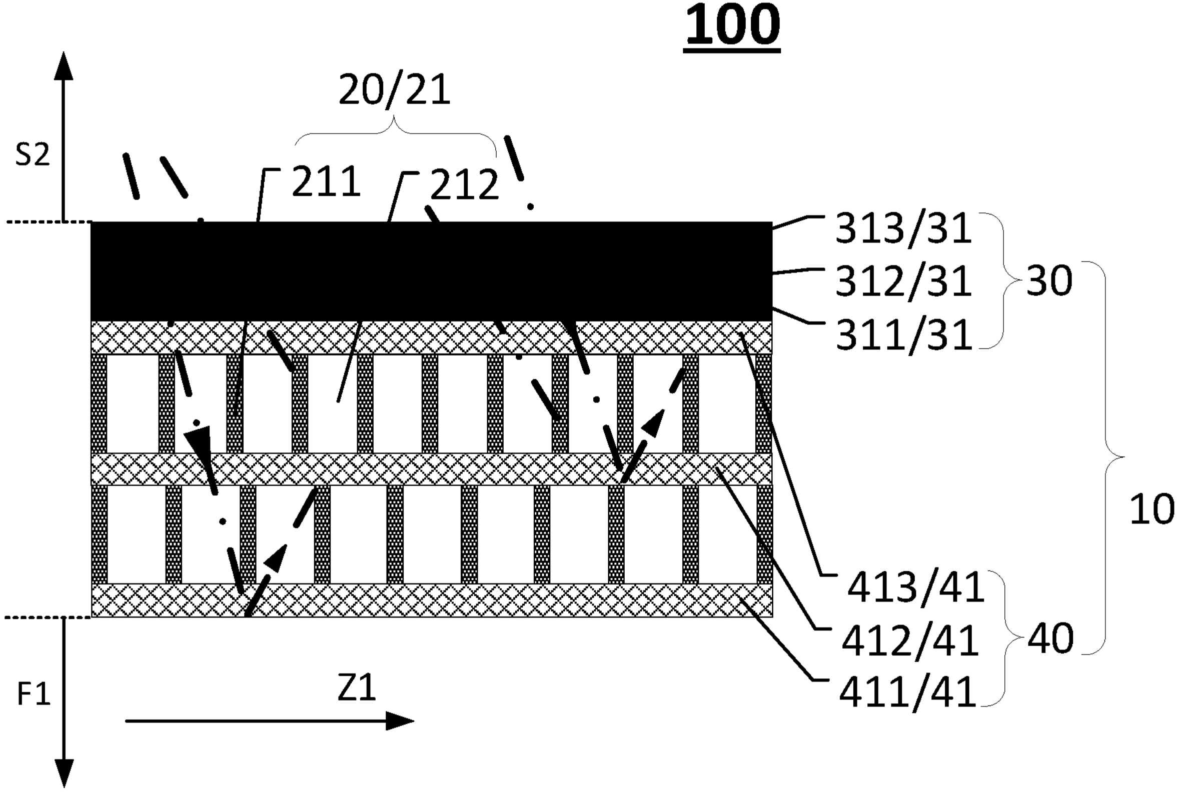
FIG. 13 illustrates another cross-sectional view of the field lens in FIG. 1 along the AA' direction, consistent with various disclosed embodiments of the present disclosure.

As shown in FIG. 1, FIG. 12 which is another cross-sectional view along the AA' direction in FIG. 1, and FIG. 13 which is another cross-sectional view along the AA' direction in FIG. 1, in another embodiment, when the pre-deflection grating 40 includes a first pre-deflection sub-grating 411, a second pre-deflection sub-grating 412, and a third pre-deflection sub-grating 413 arranged layer by layer from the first side F1 to the second side S2 of the lens body 10, the optical structure 20 may be arranged between the first pre-deflection sub-grating 411 and the second pre-deflection sub-grating 412. Correspondingly, the optical structure 20 may be used to block part of the visible light from being incident on the side of the first pre-deflection sub-grating 411, and/or the optical structure 20 may be used to block part of the light emitted toward the second side S2 of the lens body 10 after being reflected by the first pre-deflection sub-grating 411, thereby reducing the number of diffraction fringes appearing on the second side S2 of the lens body 10 and improving the display of the related display device.

In the present disclosure, when one layer of the optical structure 20 is disposed between the multi-layer gratings, the position of the optical structure 20 is not limited, as long as the optical structure 20 is able to be disposed on a side of at least one pre-deflection grating 41 facing the second side S2 of the lens body 10 for blocking part of the visible light from being incident on the side of the at least one pre-deflection sub-grating 41 and/or for blocking part of the light which is reflected by the at least one pre-deflection sub-grating 41 and is able to form diffraction fringes. As shown in FIG. 13, the multi-layers of the optical structure 20 may also be arranged between different but adjacent gratings. When the pre-deflection grating 40 includes the first pre-deflection sub-grating 411, the second pre-deflection sub-grating 412, and the third pre-deflection sub-grating 413 arranged layer by layer from the first side F1 to the second side S2, one layer of optical structure 20 may be disposed between the first pre-deflection sub-grating 411 and the second pre-deflection sub-grating 412, and another layer of optical structure 20 may be also disposed between the second pre-deflection sub-grating 412 and the third pre-deflection sub-grating 413. At this time, the layer of the optical structure 20 between the second pre-deflection sub-grating 412 and the third pre-deflection sub-gratings 413 may block the incidence of part of the visible light to sides of the second pre-deflection sub-grating 412 and the first pre-deflection sub-grating 411, and/or may block part of the light emitted to the second side S2 after being reflected by the first pre-deflection sub-grating 411. At the same time, the layer of the optical structure 20 arranged between the first pre-deflection sub-grating 411 and the second pre-deflection sub-grating 412 may block part of the visible light from emitting toward the first pre-deflection sub-grating 411, and/or may block part of the light that is reflected by the first pre-deflection sub-grating 411 and exits toward the second side S2. Further, in some embodiments, on the basis of the embodiment shown in FIG. 13, another layer of the optical structure 20 may be disposed on the second side S2 of the third pre-deflection sub-grating 413. The present disclosure has no limit on this, and the number and locations of the layers of the optical structures 20 included in the lens body 10 may be selected according to requirements.

As shown in FIG. 13, in the layers of the optical structures 20 arranged at different positions, the space between two adjacent light-shielding components 211 may all be d, and the height of the light-shielding components 211 may all be h, which may be adjusted accordingly according to requirements. It is not limited that the physical properties of the layers of the optical structure 20 set in the lens body 10 are exactly the same, and the user may adjust the values of d and h according to the angle $\alpha$ at which the optical structure 20 allows visible light to exit. For example, the values of d and h of the corresponding layers of the optical structure 20 may be set to be different when the color of the light to be blocked is different.

In addition, when the multi-layers of the optical structure 20 are arranged between different gratings, in another embodiment, the pre-deflection grating 40 may include the first pre-deflection sub-grating 411, the second pre-deflection sub-grating 412, and the third pre-deflection sub-grating 413 stacked in layer sequentially from the first side F1 to the second side S2 of the lens body 10. The converging grating 30 may include the first converging sub-grating 311, the second converging sub-grating 312, and the third converging sub-grating 313 stacked in layers sequentially from the first side F1 to the second side S2 of the lens body 10. One layer of the optical structure 20 may be disposed between the second pre-deflection sub-grating 412 and the third pre-deflection sub-grating 413, and also another layer of the optical structure 20 may be disposed between the first converging sub-grating 311 and the second converging sub-grating 312, and so on.

That is, the user may adjust the number of pre-deflection sub-gratings 41 and the number of converging sub-gratings 31 included in the lens body 10 according to actual needs, and may also adjust the number of layers of the optical structures 20 and their installation positions according to actual needs, as long as the provided optical structure 20 is able to reduce the number of diffraction fringes appearing on the second side S2 of the lens body 10 and improve the display effect of the related display device.

As shown in FIG. 10, optionally, along the direction from the first side F1 of the lens body 10 to the second side S2, the light rays that are able to pass through the lens body 10 and the optical structure 20 may include a first color light ray 51, a second color light ray 52 and a third color light ray 53. The first converging sub-grating 311 and the first pre-deflection sub-grating 411 may be used to deflect the first color light ray 51, and the second converging sub-grating 312 and the second pre-deflection sub-grating 412 may be used to deflect the second color light ray 52, and the third converging sub-grating 313 and the third pre-deflection sub-grating 413 may be used to deflect the third color light ray 53.

Specifically, in one embodiment, along the direction from the first side F1 of the lens body 10 to the second side S2, the light rays that are able to pass through the lens body 10 and the optical structure 20 may be the display layer of the display device corresponding to the field lens 100. The display laser may include the light rays of three colors: the first color light ray 51, the second color light ray 52, and the third color light ray 53. When the lens body 10 includes the first converging sub-grating 311, the second converging sub-grating 312, the third converging sub-grating 313, the first pre-deflection sub-grating 411, the second pre-deflection sub-grating 412, and the third pre-deflection sub-grating 413, the first converging sub-grating 311, the second converging sub-grating 312 and the third converging sub-grating 313 may be arranged sequentially from the first side F1 of the lens body 10 to the second side S2. At this time, the first converging sub-grating 311 and the first pre-deflection sub-grating 411 may be configured to deflect the first color light ray 51, to realize the converging and emitting of the first color light ray 51 by the lens body 10. The second converging sub-grating 312 and the second pre-deflection sub-grating 412 may be configured to deflect the second color light ray 52, to realize the converging and emitting of the second color light ray 52 by the lens body 10. The third converging sub-grating 313 and the third pre-deflection sub-grating 413 may be configured to deflect the third color light ray 53, to realize the converging and emitting of the third color light ray 53 by the lens body 10. Therefore, the converging and display of the display laser may be realized to ensure a good display effect of the display device corresponding to the field lens 100.

Figure 14:
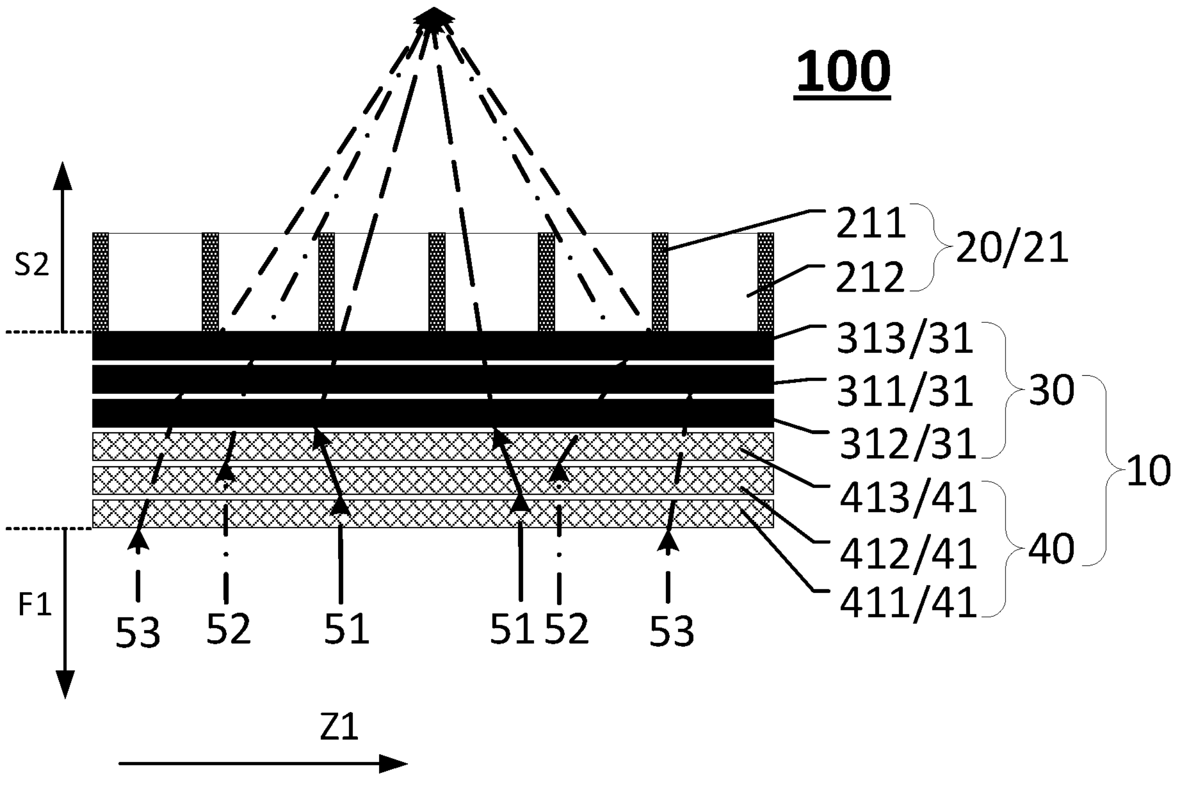
FIG. 14 illustrates another cross-sectional view of the field lens in FIG. 2 along the BB' direction, consistent with various disclosed embodiments of the present disclosure.

As shown in FIG. 2, FIG. 10, and FIG. 14 which is another cross-sectional view along the BB' direction in FIG. 2, in one embodiment, the first converging sub-grating 311 may be located on a side of the second converging sub-grating 312 away from the pre-deflection grating 40. Optionally, the first converging sub-grating 311 may be located on a side of the first pre-deflection sub-grating 411 away from the first side F1, and the second converging sub-grating 312 may be located on a side of the second pre-deflection sub-grating 412 away from the first side F1, and the third sub-converging sub-grating 313 may be located at a side of the third pre-deflection sub-grating 413 away from the first side F1.

Specifically, in the present embodiment, when the lens body 10 is provided with the first converging sub-grating 311, the second converging sub-grating 312, the third converging sub-grating 313, the first pre-deflection sub-grating 411, the second pre-deflection sub-grating 412, and the third pre-deflection sub-grating 413, the first converging sub-grating 311 and the first pre-deflection sub-grating 411 may be set to deflect the first color light ray 51, the second converging sub-grating 312 and the second pre-deflection sub-grating 412 may be set to deflect the second color light ray 52, and the third converging sub-grating 313 and the third pre-deflection sub-grating 413 may be set to deflect the third color light ray 53. Optionally, the first converging sub-grating 311 may be located on a side of the first pre-deflection sub-grating 411 away from the first side F1, and the second converging sub-grating 312 may be located on a side of the second pre-deflection sub-grating 412 away from the first side F1, and the third sub-converging sub-grating 313 may be located at a side of the third pre-deflection sub-grating 413 away from the first side F1. Therefore, among the two gratings for converging light of a same color, the corresponding converging grating 30 may be located on a side of the pre-deflection grating 40 away from the first side F1 of the lens body 10. This arrangement may be able to realize the converging effect on the light and the good display effect of the corresponding display device.

That is, it is not limited here that the first pre-deflection sub-grating 411, the second pre-deflection sub-grating 412, and the third pre-deflection sub-grating 413 in the pre-deflection grating 40 are arranged in sequence from the first side F1 to the second side S2 of the lens body 10. The arrangement positions of the first pre-deflection sub-grating 411, the second pre-deflection sub-grating 412, and the third pre-deflection sub-grating 413 may be optionally switched. Correspondingly, in the converging grating 30, it is not limited that the first converging sub-grating 311, the second converging sub-grating 312, and the third converging sub-grating 313 are arranged in sequence from the first side F1 to the second side S2 of the lens body 10. The arrangement positions of the first converging sub-grating 311, the second converging sub-grating 312, and the third converging sub-grating 313 may be switched at will; as long as it is ensured that among the two gratings used for converging light rays of the same color, the corresponding converging grating 30 is located on a side of the pre-deflection grating 40 away from the first side of the lens body 10.

When the lens body 10 includes the stacked converging grating 30 and the pre-deflection grating 40, the diffraction fringes may mainly be caused by the specular reflection of the light incident from the second side S2 of the lens body 10 by the pre-deflection grating 40. Therefore, for the light to be blocked by the optical structure 20, the optical structure 20 may be mainly used to block the light reflected by the pre-deflection grating 40. Therefore, for the gratings for converging the light of a same color, the corresponding converging grating 30 is located on a side of the pre-deflection grating 40 away from the first side of the lens body 10.

As shown in FIG. 2, FIG. 10, FIG. 14, and FIG. 15 which is another cross-sectional view along the BB' direction in FIG. 2, in another embodiment, along the direction from the first side F1 to the second side S2, the converging grating 30 may include a plurality of converging sub-gratings 31 stacked in layers, and the plurality of converging sub-gratings 31 may include a first converging sub-grating 311, a second converging sub-grating 312, and a third converging sub-grating 313.

Along the direction from the first side F1 of the lens body 10 to the second side S2, the light rays that are able to pass through the lens body 10 and the optical structure 20 may include a first color light ray 51, a second color light ray 52 and a third color light ray 53.

The first converging sub-grating 311 and the pre-deflection grating 40 may be used to deflect the first color light ray 51, and the second converging sub-grating 312 and the pre-deflection grating 40 may be used to deflect the second color light ray 52, and the third converging sub-grating 313 and the pre-deflection grating 40 may be used to deflect the third color light ray 53.

Specifically, in the present embodiment, along the direction from the first side F1 to the second side S2, the converging grating 30 may include two or more converging sub-gratings 31 stacked in layers. For example, along the direction from the first side F1 to the second side S2, the converging grating 30 may include a first converging sub-grating 311, a second converging sub-grating 312, and a third converging sub-grating 313. The pre-deflection grating 40 may only include a single-layer pre-deflection grating 40 and does not include pre-deflection sub-gratings 41 arranged in multiple layers. That is to say, in the present embodiment, the lens body 10 may only include four layers of grating structures, that is, the first converging sub-grating 311, the second converging sub-grating 312, the third converging sub-grating 313, and the pre-deflection grating 40, along the direction from the first side F1 to the second side S2.

Specifically, in one embodiment, along the direction from the first side F1 of the lens body 10 to the second side S2, the light rays that are able to pass through the lens body 10 and the optical structure 20 may be the display layer of the display device corresponding to the field lens 100. The display laser may include the light rays of three colors: the first color light ray 51, the second color light ray 52, and the third color light ray 53. The first converging sub-grating 311 and the pre-deflection grating 40 may be used to deflect the first color light ray 51, to realize the converging and emitting of the first color light ray 51 by the lens body 10. The second converging sub-grating 312 and the pre-deflection grating 40 may be used to deflect the second color light ray 52, to realize the converging and emitting of the second color light ray 52 by the lens body 10. The third converging sub-grating 313 and the pre-deflection grating 40 may be used to deflect the third color light ray 53, to realize the converging and emitting of the third color light ray 53 by the lens body 10. Therefore, the converging and display of the display laser may be realized to ensure a good display effect of the display device corresponding to the field lens 100.

Through the setting method provided by the above-mentioned embodiment, it is possible to realize the converging and display of the three color display lasers by the lens body 10, and also to ensure that the thickness of the lens body 10 is as thin as possible. Therefore, the overall manufacturing process of the display device corresponding to the field lens 100 may be prevented from being too complex, and excessive thickness and weight of the display device may be avoided to improve the lightness and thinness of the corresponding display device.

In one embodiment, when a single-layer pre-deflection grating 40 is provided, the pre-deflection grating 40 may be configured as that three periods of different pre-deflection gratings 40 are spatially superimposed together, and these three periods may specifically be a first period for pre-deflection the first color light ray 51, a second period for pre-deflection the second color light ray 52, and a third period for pre-deflection the third color light 53. It should be noted that the pre-deflection grating 40 formed by superimposing three periods is not a grating with a fixed period.

Figure 16:
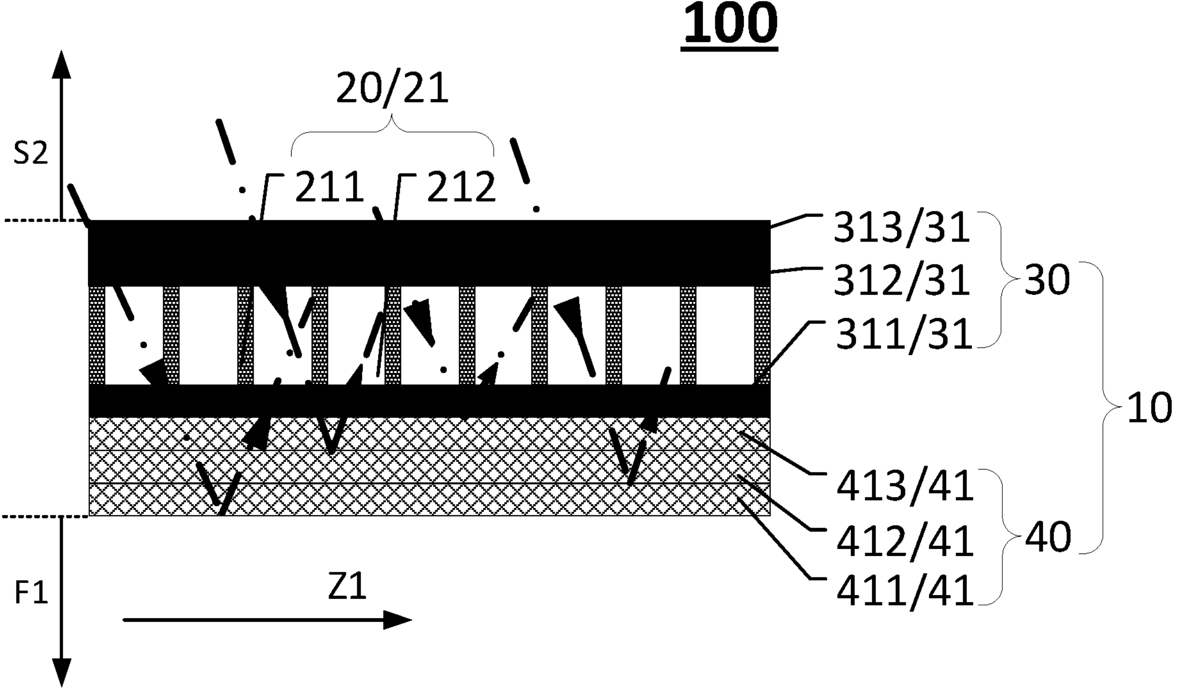
FIG. 16 illustrates another cross-sectional view of the field lens in FIG. 1 along the AA' direction, consistent with various disclosed embodiments of the present disclosure.
Figures 17, 18:
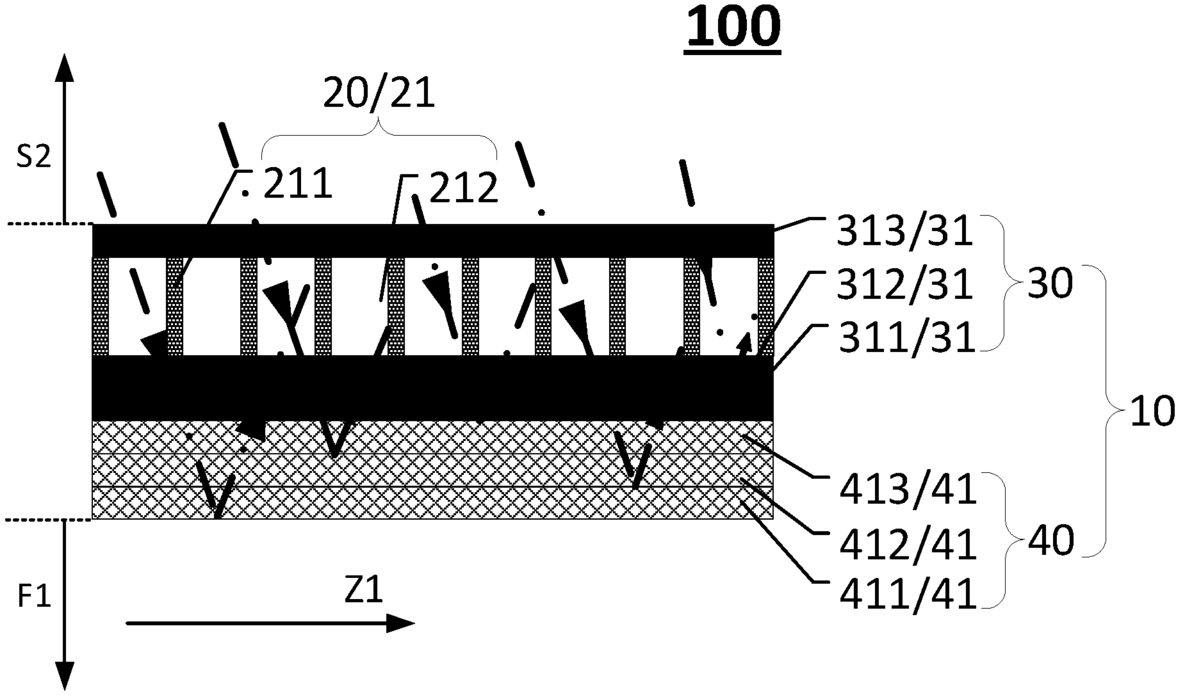
FIG. 17 illustrates another cross-sectional view of the field lens in FIG. 1 along the AA' direction, consistent with various disclosed embodiments of the present disclosure.
FIG. 18 illustrates a periodic diagram of an exemplary converging sub-grating consistent with various disclosed embodiments of the present disclosure.

As shown in FIG. 1, FIG. 16 which is another cross-sectional view along the AA' direction in FIG. 1, and FIG. 17 which is another cross-sectional view along the AA' direction in FIG. 1, the optical structure 20 may be arranged between two adjacent converging sub-gratings 31.

Specifically, in the present embodiment, the converging grating 30 may include the first converging sub-grating 311, the second converging sub-grating 312, and the third converging sub-grating 313. As shown in FIG. 16, the optical structure 20 may be disposed between the first converging sub-grating 311 and the second converging sub-grating 312. As shown in FIG. 17, in another embodiment, the optical structure 20 may be disposed between the second converging sub-grating 312 and the third converging sub-grating 313. In some other embodiment, a layer of the optical structure 20 may be disposed between the first converging sub-grating 311 and the second converging sub-grating 312, and another layer of the optical structure 20 may be disposed between the second converging sub-grating 312 and the third converging sub-grating 313.

As shown in FIG. 16, when the first converging sub-grating 311, the second converging sub-grating 312, and the third converging sub-grating 313 are disposed sequentially along the direction from the first side F1 to the second side S2 of the lens body, and the optical structure 20 is disposed between the first converging sub-grating 311 and the second converging sub-grating 312, the optical structure 20 may be used to block part of the visible light from being incident on the side of the first converging sub-grating 311 and the pre-deflection grating 40, and the optical structure 20 may be used to block part of the light emitted toward the second side S2 of the lens body 10 after being reflected by the first converging sub-grating 311 and the pre-deflection grating 40. As shown in FIG. 17, when the first converging sub-grating 311, the second converging sub-grating 312, and the third converging sub-grating 313 are disposed sequentially along the direction from the first side F1 to the second side S2 of the lens body, and the optical structure 20 is disposed between the second converging sub-grating 312 and the third converging sub-grating 313, the optical structure 20 may be used to block part of the visible light from being incident on the side of the first converging sub-grating 311, the second converging sub-grating 312, and the pre-deflection grating 40, and the optical structure 20 may be used to block part of the light emitted toward the second side S2 of the lens body 10 after being reflected by the first converging sub-grating 311, the second converging sub-grating 312, and the pre-deflection grating 40. The number of diffraction fringes appearing on the second side S2 of the lens body 10 may be reduced, improving the display of the related display device.

FIG. 18 is a schematic diagram of a period of a converging sub-grating provided by one embodiment of the present disclosure. As shown in FIG. 18, in one embodiment, the period T of the converging sub-grating 31 may be a gradual change period T.

Along a direction perpendicular to the thickness direction of the converging sub-grating 31, the period T of the converging sub-grating 31 may gradually increase from the edge to the middle.

Specifically, in the present embodiment, the period T of any converging sub-grating 31 may be configured to be a gradual period T. Specifically, along the direction perpendicular to the thickness of the converging sub-grating 31, that is, along the direction of the plane where the converging sub-grating 31 is located, the period T of the converging sub-grating 31 may specifically show a trend of gradually increasing from the edge to the middle. When the period T is denser, the refraction ability of light may be stronger. In this way, for the light incident at the edge of the converging sub-grating 31, the converging ability of the converging sub-grating 31 may be stronger, to converge the light. The display effect of the display device corresponding to the field lens may be improved.

Figure 15:
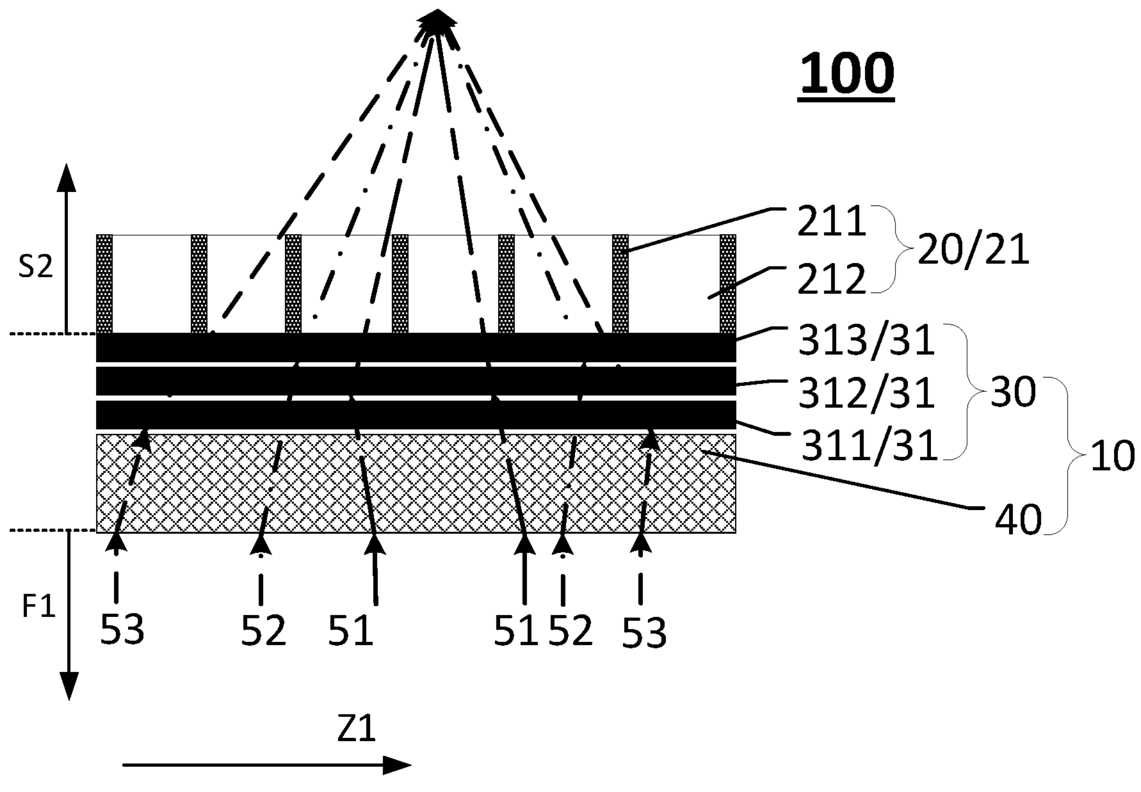
FIG. 15 illustrates another cross-sectional view of the field lens in FIG. 2 along the BB' direction, consistent with various disclosed embodiments of the present disclosure.
Figure 19:
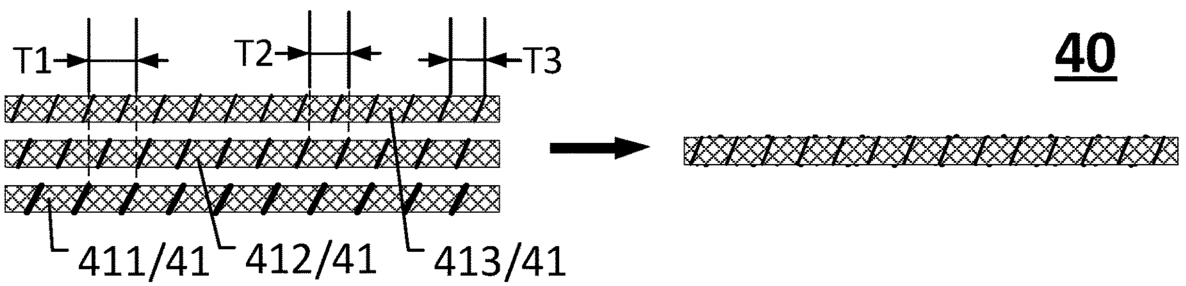
FIG. 19 illustrates a periodic diagram of an exemplary pre-polarized grating consistent with various disclosed embodiments of the present disclosure.

FIG. 19 is a schematic diagram of a period of the pre-deflection grating in FIG. 15. As shown in FIG. 15 and FIG. 19, in one embodiment, the pre-deflection grating 40 may include a first pre-deflection sub-grating 411, a second pre-deflection sub-grating 412, and a third pre-deflection sub-grating 413 spatially superposed. Optionally, the pre-deflection grating 40 may include the first pre-deflection sub-grating 411 for deflecting the first color light ray 51, the second pre-deflection sub-grating 412 for deflecting the second color light ray 52, and the third pre-deflection sub-grating 413 for deflecting the third color light ray 53.

Along a direction perpendicular to the direction from the first side F1 to the second side S2, the first pre-deflection sub-grating 411, the second pre-deflection sub-grating 412, and the third pre-deflection sub-grating 413 may be arranged in the same layer.

Specifically, in the present embodiment, the lens body 10 may include the first pre-deflection sub-grating 411 for deflecting the first color light ray 51, the second pre-deflection sub-grating 412 for deflecting the second color light ray 52, and the third pre-deflection sub-grating 413 for deflecting the second color light ray 52. Further, along the direction perpendicular to the direction from the first side F1 to the second side S2, the first pre-deflection sub-grating 411, the second pre-deflection sub-grating 412, and the third pre-deflection sub-grating 413 may be arranged in the same layer. That is, the pre-deflection grating 40 including the three pre-deflection sub-gratings 41 may appear as a single-layer pre-deflection grating 40 along the direction from the first side F1 to the second side S2 of the lens body 10. The pre-deflection grating 40 may be used for deflecting the first color light ray 51, deflecting the second color light ray 52, and deflecting the third color light ray 53 at the same time. Therefore, it is possible to realize the deflection of the three color display lasers by the pre-deflection grating 40, and also to ensure that the thickness of the lens body 10 is as thin as possible. Therefore, the overall manufacturing process of the display device corresponding to the field lens 100 may be prevented from being too complex, and excessive thickness and weight of the display device may be avoided to improve the lightness and thinness of the corresponding display device.

In another embodiment, when the first pre-deflection sub-grating 411, the second pre-deflection sub-grating 412, and the third pre-deflection sub-grating 413 are arranged in the same layer, the pre-deflection grating 40 may be configured to be formed by three pre-deflection sub-gratings 41 with different periods superimposed spatially. The three periods may be a first period for deflecting the first color light ray 51, a second period for deflecting the second color light ray 52, and a third period for deflecting the third color light ray 53. The pre-deflection grating 40 formed by three pre-deflection sub-gratings 41 with different periods superimposed spatially is not a grating with a fixed period.

As shown in FIG. 15 and FIG. 16, optionally, the period of the first pre-deflection sub-grating 411 may be T1, the period of the second pre-deflection sub-grating 412 may be T2, and the period of the third pre-deflection sub-grating 413 may be T3, where $T1 \neq T2 \neq T3$.

Specifically, the pre-deflection grating 40 may include the first pre-deflection sub-grating 411 for deflecting the first color light ray 51, the second pre-deflection sub-grating 412 for deflecting the second color light ray 52, and the third pre-deflection sub-grating 413 for deflecting the third color light ray 53. The period of the pre-deflection sub-grating 41 is related to the wavelength of the light to be deflected. For example, the period corresponding to the red light with a wavelength of 700 nm may be set to be 1029 nm, the period corresponding to the green light with a wavelength of 546 nm may be set to be 478 nm, and the period corresponding to the blue light with a period of 435 nm may be set to be 836 nm. The period T1 of the first pre-deflection sub-grating 411, the period T2 of the second pre-deflection sub-grating 412, and the period T3 of the third pre-deflection sub-grating 413 may be set to be different from each other.

That is, the periods of the pre-deflection sub-gratings 41 corresponding to light with different colors may be set to be different, and a period of a pre-deflection sub-grating 41 corresponding to light with a same color may be fixed. For example, the first color light 51 is red light, the second color light 52 is green light, and the third color light 53 is blue light. Correspondingly, the period T1 of the first pre-deflection sub-grating 411 may be configured to be larger than the period T3 of the third pre-deflection sub-grating 413, and the period T3 of the third pre-deflection sub-grating 413 may be configured to be larger than the period T2 of the second pre-deflection sub-grating 412.

As shown in FIG. 3, in one embodiment, the first side F1 may be a functional light incident side, and the second side S2 may be a functional light output side.

Specifically, in the present embodiment, the first side F1 of the lens body 10 may be the functional light incident side, such as the emitting side of the display laser of the display device. The second side S2 of the lens body 10 may be the functional light output side, for example, the converging/imaging side of the display light in the corresponding display device.

Figure 20:
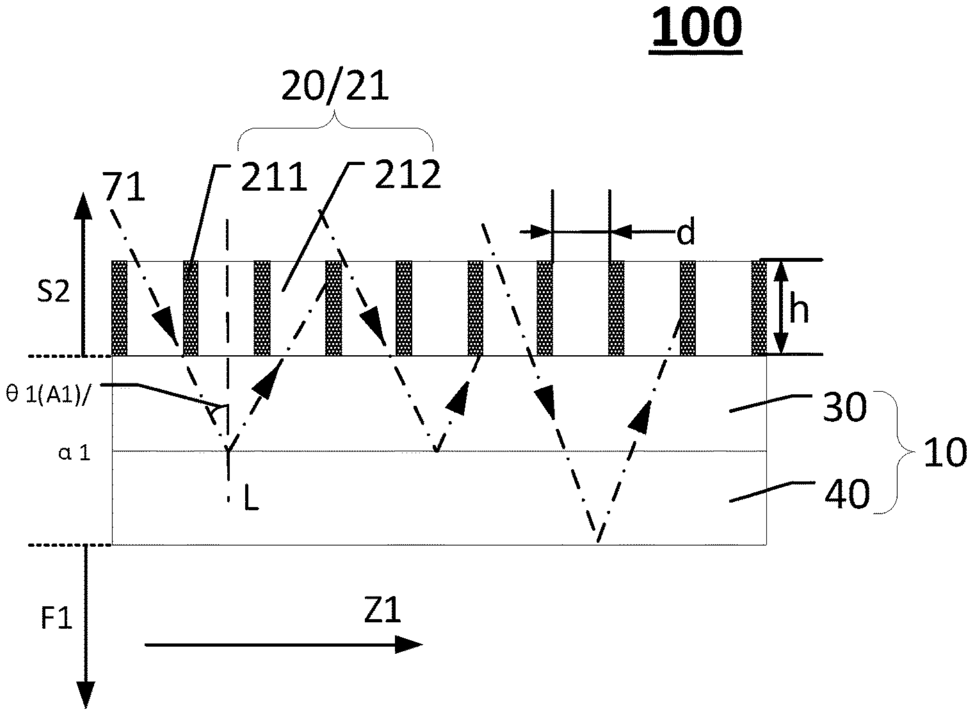
FIG. 20 illustrates another cross-sectional view of the field lens in FIG. 2 along the BB' direction, consistent with various disclosed embodiments of the present disclosure.

As shown in FIG. 2, FIG. 3, and FIG. 20 which is another cross-sectional view along the BB' direction in FIG. 2, another embodiment of the present disclosure provides another field lens 100 including a lens body 10 and an optical structure 20.

The lens body 10 may include at least two grating layers (30/40). Along the direction perpendicular to the plane where the lens body 10 is located, the lens body 10 may include a first side F1 and a second side S2. The optical structure 20 may be located on a side of at least one grating layer (30/40) close to the second side S2.

The angle at which the lens body 10 diffracts the first color light 71 may be $\theta 1$, and the angle at which the optical structure 20 allows the first color light 71 to exit may be $\alpha 1$, where $\alpha 1 < \theta 1$; the lens body 10. The minimum angle at which the first color light 71 is diffracted by the lens body may be A1, where $\alpha 1 < A1$.

The angle $\theta$1 at which the lens body 10 diffracts the first color light 71 may be the angle at which diffraction occurs in the angles formed between the light and the normal line L when the light exits to the side of the lens body 10. The angle at which the optical structure 20 allows the first color light 71 to exit may be the angle at which the first color light 71 is allowed to exit among the angles formed between the light and the normal line L when the light is emitted toward the lens body 10. The minimum angle A1 at which the first color light 71 is diffracted by the lens body 10 may be the minimum angle at which diffraction occurs among the angles formed between the light and the normal line L when the light is emitted toward the lens body 10. Specifically, the present disclosure also provides another field lens 100. The field lens 100 may include the lens body 10 and the optical structure 20. The lens body 10 may include two or more grating layers (30/40), and each grating layer (30/40) may include a substrate which may be made of glass. That is, the gratings (30/40) may be made on glass substrates. Also, the substrate may be made of other materials, and the present disclosure does not specifically limit this. Along the direction perpendicular to the plane where the lens body 10 is located, the lens body 10 may include the first side F1 and the second side S2. The first side F1 may be a side that receives the display light, and the second side S2 may be a side where the display light exits. There may also be external light entering the second side S2. In the present embodiment, the optical structure 20 may be disposed on a side of at least one grating layer (30/40) close to the second side S2. For example, the optical structure 20 may be disposed on the side of the second side S2 of the entire lens body 10.

Since the external light (first color light 71) incident from the second side S2 of the lens body 10 to the first side F1 will be reflected by the substrate corresponding to the grating (30/40) in the lens body 10, especially when glass is used to make the substrate, the reflection of the external lights by the glass substrate may be more obvious. In the present embodiment, the optical structure 20 may be used to block part of the visible light (first color light ray 71) from being incident on the side of the lens body 10, and/or the optical structure 20 may be used to block at least part of the light which is reflected by the glass substrate included in the grating (30/40) and emitted toward the second side S2. Therefore, the first color light ray 71 emitted toward the second side S2 of the lens body 10 after being reflected by the grating 30/40 may be reduced. The number of the diffraction fringes on the second side S2 of the lens body 10 that can be observed by the user may be reduced, to weaken the influence of the diffraction fringes on the display effect.

The optical structure 20 in the field lens 100 may be arranged on the second side S2 of the entire lens body 10, or may be arranged on the second side S2 of any grating layer (30/40) in the lens body 10, or may be arranged on the second sides S2 of at least two different grating layers (30/40). The present disclosure has no limit on the number of optical structures 20 included in the field lens 100 and the location of the optical structures 20. The user may adjust the setting position and quantity of the optical structure 20 according to actual needs, as long as the optical structure 20 is able to reduce the amount of visible light (first color light 71) incident on the lens body 10 and/or to reduce the amount of light emitted toward the second side of the lens body 10 after being reflected by the substrate of the lens body 10 for reducing the number of diffraction fringes. As long as the optical structure 20 is arranged on the second side S2 of any grating (30/40), the amount of visible light received by any grating (30/40) existing in the first side F1 of the optical structure 20 may be reduced, and/or, the amount of reflected visible light that may be reduced. The amount of light emitted toward the second side S2 of the lens body 10 after being reflected may also be reduced, such that the effect of reducing the diffraction fringes on the second side S2 of the field lens 100 may be achieved. The influence of diffraction fringes on the display effect may be reduced to a certain extent, and the display effect of the related display device may be improved.

When the angle at which the lens body 10 is able to diffract the first color light 71 incident from its second side S2 toward the first side F1 is 01, the angle at which the optical structure 20 allows the first color light 71 to exit may be set to be α1 with α1<θ1, such that the first color light 71 emitted toward the second side S2 of the lens 10 after being reflected by the grating (30/40) in the lens body 10 may be blocked by the optical structure 20. Therefore, the first color light 71 incident on the lens body 10 from the second side S2 of the lens body 10, may not be reflected by the grating (30/40) in the lens body 10 and then emitted to the second side S2 side of the lens body 10. That is, the diffracted light may not appear on the second side S2 of the lens body 10, and the influence of diffraction fringes on the display effect may be avoided, improving the display effect of the related display device.

When the minimum angle at which the lens body 10 diffracts the first color light 71 is A1, as long as the angle at which the optical structure 20 allows the first color light 71 to emit is smaller than A1, the first color light 71 emitted toward the second side of the lens body 10 after being reflected by the grating 30/40 in the lens body 10 may be blocked by the optical structure 20. Therefore, the first color light 71 incident on the lens body 10 from the second side S2 of the lens body 10, may not be reflected by the grating (30/40) in the lens body 10 and then emitted to the second side S2 side of the lens body 10. That is, the diffracted light may not appear on the second side S2 of the lens body 10, and the influence of diffraction fringes on the display effect may be avoided, improving the display effect of the related display device.

Figure 21:
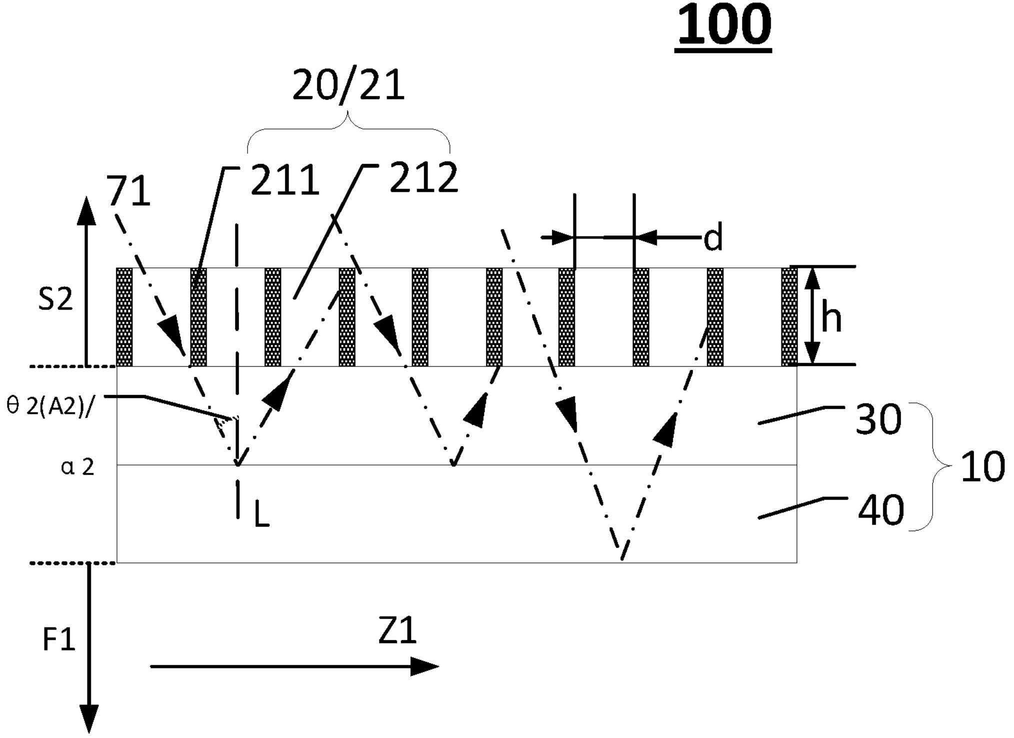
FIG. 21 illustrates another cross-sectional view of the field lens in FIG. 2 along the BB' direction, consistent with various disclosed embodiments of the present disclosure.
Figure 22:
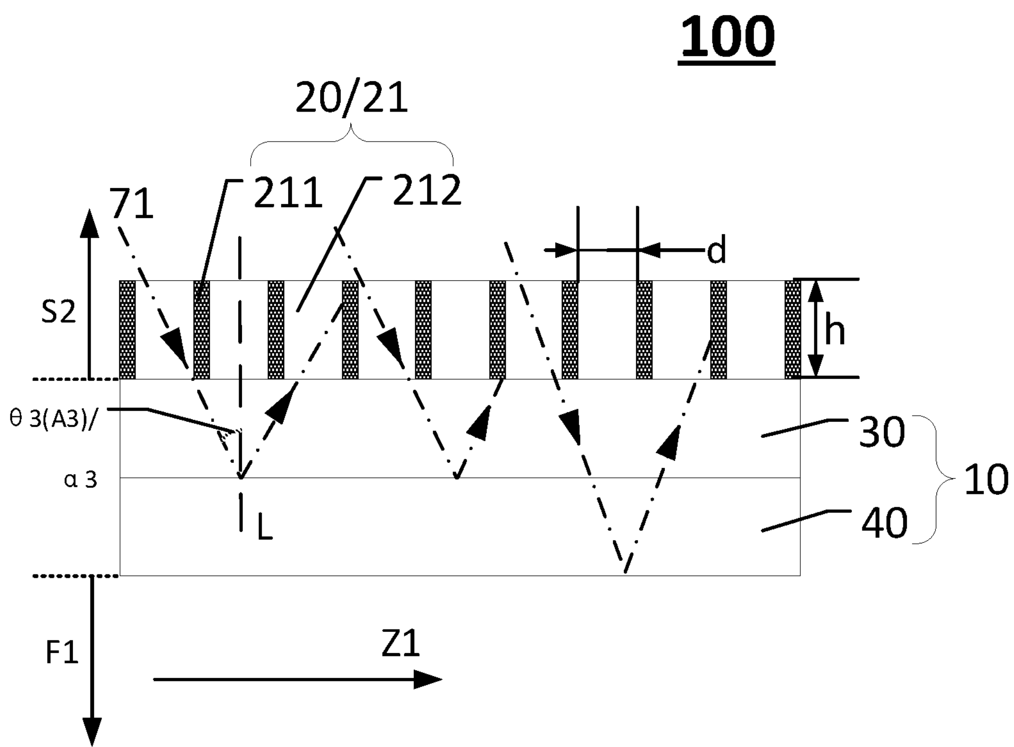
FIG. 22 illustrates another cross-sectional view of the field lens in FIG. 2 along the BB' direction, consistent with various disclosed embodiments of the present disclosure.

FIG. 21 shows another cross-sectional view along the BB' direction in FIG. 2 and FIG. 22 shows another cross-sectional view along the BB' direction in FIG. 2. As shown in FIG. 2, FIG. 3, FIG. 21, and FIG. 22, in one embodiment, the angle at which the lens body 10 diffracts the second color light 72 may be θ2, and the angle at which the optical structure 20 allows the second color light 72 to exit may be α2, where α2<θ2. The minimum angle at which the body 10 diffracts the second color light 72 may be A2, where α2<A2. And/or, the angle at which the lens body 10 diffracts the third color light 73 may be θ3, and the angle at which the optical structure 20 allows the third color light 73 to exit may be α3, where α3<θ3; and the minimum angle at which the lens body 10 diffracts the third color light 73 may be A3, where α3<A3.

The angle θ2 at which the lens body 10 diffracts the second color light 72 may be the angle at which diffraction occurs in the angles formed between the light and the normal line L when the light exits to the side of the lens body 10. The angle α2 at which the optical structure 20 allows the second color light 72 to exit may be the angle at which the second color light 72 is allowed to exit among the angles formed between the light and the normal line L when the light is emitted toward the side of the lens body 10. The minimum angle A2 at which the second color light 72 is diffracted by the lens body 10 may be the minimum angle at which diffraction occurs among the angles formed between the light and the normal line L when the light is emitted toward the side of the lens body 10. When the angle at which the lens body 10 is able to diffract the second color light 72 incident from its second side S2 toward the first side F1 is 02, the angle at which the optical structure 20 allows the second color light 72 to exit may be set to be α2 with α2<θ2, such that the second color light 72 emitted toward the second side S2 of the lens 10 after being reflected by the grating (30/40) in the lens body 10 may be blocked by the optical structure 20. Therefore, the second color light 72 incident on the lens body 10 from the second side S2 of the lens body 10, may not be reflected by the grating (30/40) in the lens body 10 and then emitted to the second side S2 side of the lens body 10. That is, the diffracted light may not appear on the second side S2 of the lens body 10, and the influence of diffraction fringes on the display effect may be avoided, improving the display effect of the related display device.

When the minimum angle at which the lens body 10 diffracts the second color light 72 is A2, as long as the angle at which the optical structure 20 allows the second color light 72 to emit is smaller than A2, the second color light 72 emitted toward the second side S2 of the lens body 10 after being reflected by the grating 30/40 in the lens body 10 may be blocked by the optical structure 20. Therefore, the second color light 72 incident on the lens body 10 from the second side S2 of the lens body 10, may not be reflected by the grating (30/40) in the lens body 10 and then emitted to the second side S2 side of the lens body 10. That is, the diffracted light may not appear on the second side S2 of the lens body 10, and the influence of diffraction fringes on the display effect may be avoided, improving the display effect of the related display device.

The angle θ3 at which the lens body 10 diffracts the third color light 73 may be the angle at which diffraction occurs in the angles formed between the light and the normal line L when the light exits to the side of the lens body 10. The angle α3 at which the optical structure 20 allows the third color light 73 to exit may be the angle at which the third color light 73 is allowed to exit among the angles formed between the light and the normal line L when the light is emitted toward the side of the lens body 10. The minimum angle A3 at which the third color light 73 is diffracted by the lens body 10 may be the minimum angle at which diffraction occurs among the angles formed between the light and the normal line L when the light is emitted toward the side of the lens body 10. When the angle at which the lens body 10 is able to diffract the third color light 73 incident from its second side S2 toward the first side F1 is θ3, the angle at which the optical structure 20 allows the third color light 73 to exit may be set to be α3 with α3<θ3, such that the third color light 73 emitted toward the second side S2 of the lens 10 after being reflected by the grating (30/40) in the lens body 10 may be blocked by the optical structure 20. Therefore, the third color light 73 incident on the lens body 10 from the second side S2 of the lens body 10, may not be reflected by the grating (30/40) in the lens body 10 and then emitted to the second side S2 side of the lens body 10. That is, the diffracted light may not appear on the second side S2 of the lens body 10, and the influence of diffraction fringes on the display effect may be avoided, improving the display effect of the related display device.

When the minimum angle at which the lens body 10 diffracts the third color light 73 is A3, as long as the angle at which the optical structure 20 allows the third color light 73 to emit is smaller than 32, the third color light 73 emitted toward the second side S2 of the lens body 10 after being reflected by the grating 30/40 in the lens body 10 may be blocked by the optical structure 20. Therefore, the second color light 72 incident on the lens body 10 from the second side S2 of the lens body 10, may not be reflected by the grating (30/40) in the lens body 10 and then emitted to the second side S2 side of the lens body 10. That is, the diffracted light may not appear on the second side S2 of the lens body 10, and the influence of diffraction fringes on the display effect may be avoided, improving the display effect of the related display device.

As shown in FIG. 3, FIG. 20, FIG. 21, and FIG. 22, optionally, the first color light 71 may be red light, the second color light 72 may be green light, and the third color light 73 may be blue light, where A2>A1 and/or A2>A3.

Specifically, the first color light 71 may be red light, the second color light 72 may be green light, and the third color light 73 may be blue light. The minimum angle A2 at which the lens body 10 diffracts green light may be configured to be larger than the minimum angle A1 at which the lens body 10 diffracts red light, and/or, the minimum angle A2 at which the lens body 10 diffracts green light may be configured to be larger than the minimum angle A3 at which diffraction occurs for blue light.

As shown in FIG. 3 to FIG. 5, optionally, the range of angles at which the lens body 10 diffracts visible light may be $\theta$, and the angle at which the optical structure 20 allows visible light to exit may be $\alpha$, where $\alpha<0$.

The angle $\theta$ at which the lens body 10 diffracts light may be the angle at which diffraction occurs in the angles formed between the light and the normal line L when the light exits to the side of the lens body 10. The angle $\alpha$ at which the optical structure 20 allows the light to exit may be the angle at which the light is allowed to exit among the angles formed between the light and the normal line L when the light is emitted toward the side of the lens body 10. When the angle at which the lens body 10 is able to diffract the light incident from its second side S2 toward the first side F1 is $\theta$, the angle at which the optical structure 20 allows the light to exit may be set to be $\alpha$ with $\alpha<0$, such that the light emitted toward the second side S2 of the lens 10 after being reflected by the grating (30/40) in the lens body 10 may be blocked by the optical structure 20. Therefore, the light incident on the lens body 10 from the second side S2 of the lens body 10, may not be reflected by the grating (30/40) in the lens body 10 and then emitted to the second side S2 side of the lens body 10. That is, the diffracted light may not appear on the second side S2 of the lens body 10, and the influence of diffraction fringes on the display effect may be avoided, improving the display effect of the related display device.

As shown in FIG. 3 to FIG. 5, optionally, the minimum angle at which the lens body 10 diffracts the visible light may be A, where $\alpha<A$.

The minimum angle A at which the lens body 10 diffracts the visible light may be the minimum angle among the angles formed between the light and the normal line L when the light is emitted toward the side of the lens body 10. When the minimum angle at which the lens body 10 diffracts the visible light is A, as long as the angle at which the optical structure 20 allows the visible light to emit is smaller than A, the visible light emitted toward the second side S2 of the lens body 10 after being reflected by the grating 30/40 in the lens body 10 may be blocked by the optical structure 20. Therefore, the visible light incident on the lens body 10 from the second side S2 of the lens body 10, may not be reflected by the grating (30/40) in the lens body 10 and then emitted to the second side S2 side of the lens body 10. That is, the diffracted light may not appear on the second side S2 of the lens body 10, and the influence of diffraction fringes on the display effect may be avoided, improving the display effect of the related display device.

The minimum angle A at which the first grating 40 diffracts visible light may be the minimum angle at which the diffraction is able to occur among the angles formed between the light and the normal line L corresponding to the substrate of the first grating 40 when the light exits toward the side of the lens body 10. The minimum angle K at which the second grating 30 diffracts visible light may be the minimum angle at which the diffraction is able to occur among the angles formed between the light and the normal line L corresponding to the substrate of the second grating 30 when the light exits toward the side of the lens body 10. In one embodiment, for example, when the lens body 10 includes the first grating 30 and the second grating 40 arranged in sequence along the direction from the first side F1 to the second side S2, the minimum angle at which the first grating 30 diffracts the visible light may be A and the minimum angle at which the second grating 40 diffracts visible light may be K. When A is smaller than K and the optical structure 20 is arranged between the first grating 30 and the second grating 40, the optical structure 20 may be configured to only block the light reflected by the first grating 30 from exiting toward the second side S2 of the lens body 10, which is able to be realized by setting the angle at which the optical structure 20 allows the visible light to exit to be smaller than A. When the optical structure 20 is arranged on the side of the second grating 40 far away from the first grating 30 and $\alpha<K$, only the light reflected by the second grating 40 may be blocked from being emitted toward the second side S2 of the lens body 10 after being reflected by the second grating 40. But for the first grating 40, only part of the light reflected by the first grating 40 may be blocked from exiting toward the second side S2 of the lens body 10. When it is desired to block the light reflected by the first grating 30 and the second grating 40 from being emitted toward the second side S2 of the lens body 10 at the same time, the angle $\alpha$ at which the optical structure 20 allows the visible light to exit may be set to be smaller than A. Since A is smaller than K, setting $\alpha<K$ may only block part of the reflected light from being emitted toward the second side S2 of the lens body 10. By setting $\alpha<A$, all the light may be blocked from being reflected and then emitted to the second side S2 of the lens body 10. That is, as long as the optical structure 20 is able to block the diffracted light at the smallest angle for visible light, it may also be able to block other light that wants to exit toward the second side S2 of the lens body 10 after being reflected by the grating (30/40).

As shown in FIG. 3 to FIG. 5, in one embodiment, the optical structure 20 may include a light confinement layer 21, and the light confinement layer 21 may include a plurality of light-shielding components 211 and a plurality of light-transmitting components 212 arranged alternately along a first direction Z1. The first direction Z1 may be perpendicular to the direction from the first side F1 toward the second side S2.

Specifically, in the present embodiment, the optical structure 20 may include the light confinement layers 21. The light confinement layer 21 may include the plurality of light-shielding components 211 and the plurality of light-transmitting components 212. The plurality of light-shielding components 211 and the plurality of light-transmitting components 212 may be arranged alternately along a direction perpendicular to the direction from the first side F1 to the second side S2. The plurality of light shielding components 211 may be used to block part of the incident light entering the first side F1 through the second side S2 of the lens body 10, and/or the plurality of light shielding components 211 may be used to block the light entering the first side F1 through the second side S2 of the lens body 10 from exiting toward the second side S2 after being reflected by the grating (30/40) in the lens body 10, to reduce the number of diffraction fringes on the second side S2 of the lens body 10 and improve the display effect of the relevant display device. The plurality of light-transmitting parts 212 may be used for the transmission of the display light of the first side F1 of the lens body 10, to ensure the normal display function of the relevant display device and prevent the light confinement layer 21 from affecting the normal display effect of the related display device.

As shown in FIG. 3 to FIG. 5, optionally, a portion of spacing d between adjacent light-shielding components 211 may be configured to be same, and height h of a portion of the plurality of light-shielding components 211 may be configured to be same along the direction from the first side F1 to the second side S2.

Specifically, in one embodiment, the optical structure 20 may include the light confinement layers 21. The light confinement layer 21 may include the plurality of light-shielding components 211 and the plurality of light-transmitting components 212. The plurality of light-shielding components 211 and the plurality of light-transmitting components 212 may be arranged alternately along a direction perpendicular to the first side F1 and toward the second side S2. A portion of the spacing d between adjacent light-shielding components 211 of the plurality of light-shielding components 211 may be configured to be same, and the height h of a portion of the plurality of light-shielding components 211 may be configured to be same along the direction from the first side F1 to the second side S2. In some embodiments, the spacing d between any adjacent light-shielding components 211 of the plurality of light-shielding components 211 may be configured to be same, and the height h of all of the plurality of light-shielding components 211 in the optical confinement layer 21 may be configured to be same along the direction from the first side F1 to the second side S2.

As shown in FIG. 3 to FIG. 5, in one embodiment, the spacing between adjacent light-shielding components 211 of the plurality of light-shielding components 211 may be d, and the height of one of the plurality of light-shielding components along the direction from the first side F1 to the second side S2 may be h, and the angle at which the optical structure 20 allows visible light to exit may be $\alpha$, where $\alpha=(1/2)*\arctan(h/d)$.

Since the height h and spacing d of the light shielding parts 211 may control the size of the viewing angle $\beta$ of the light emitted from the first side F1 to the second side S2, in the case of the same height h, the smaller the spacing d is, the smaller the viewing angle $\beta$ will be. When d is large, the viewing angle $\beta$ will be relatively larger. When the spacing d is equal, the viewing angle $\beta$ may be relatively large if the height h is small, and the viewing angle $\beta$ will be relatively small if the height h is large. Therefore, by setting all of the plurality of light-shielding components 211 in the light confinement layer 21 to have the same height h and spacing d, uniform control of the viewing angle $\beta$ of the light emitted from the first side F1 to the second side S2 of the light confinement layer 21 may be achieved. The angle $\alpha$ at which the optical structure 20 allows visible light to exit may be the angle at which visible light is allowed to exit among angles formed between the light and the normal line L when the light exits toward the side of the lens body 10. Therefore, the value of the angle $\alpha$ may be configured to be ½ of the view angle $\beta$.

The value of $\alpha$ may be adjusted by adjusting d and h. Therefore, in one embodiment, any d in the light confinement layer 21 may be set to be equal, and any h may be set to be equal. That is, the spacing d between any adjacent light-shielding components 211 of the plurality of light-shielding components 211 may be configured to be same, and the height h of all of the plurality of light-shielding components 211 in the optical confinement layer 21 may be configured to be same along the direction from the first side F1 to the second side S2. Correspondingly, the angle at which the optical structure 20 allows visible light to exit may be calculated by $\alpha=(1/2)*\arctan(h/d)$. The angle $\alpha$ at which the optical structure 20 allows visible light to exit may be equivalent to ½ of the above-mentioned viewing angle $\beta$. It can also be seen from the above formula that, when h is constant, the viewing angle $\beta$ will be smaller when the spacing d is smaller and the viewing angle $\beta$ will be larger when the spacing d is larger. When d is constant, the viewing angle $\beta$ will be larger when the height h is smaller and the viewing angle $\beta$ will be smaller when the height h is larger. In one optional embodiment, the spacing d may range from 100 μm to 1 mm. When the spacing d is larger than 1 mm, the amount of light that can be blocked may be greatly reduced, making it difficult to achieve the desired effect of reducing the diffraction fringes. When the spacing d is less than 100 μm, the display light may not normally pass through the optical structure 20 and exit to the user side, and the user cannot see the desired display image, which affects the display effect of the corresponding display device.

In one embodiment, the light confinement layer 21 may be embodied as a louver structure, and the spacing d may be distance between the slats in the louver, and the height h may be the thickness of the louver. FIG. 6 is another structural schematic diagram of the optical structure provided by one embodiment of the present application. As shown in FIG. 3, FIG. 4 and FIG. 6, in addition to the light confinement layer 21, the optical structure 20 may further include a polyethylene terephthalate (PET) layer 213 disposed on a side of the light confinement layer 21 facing the first side F1, and the PET layer 213 may be bonded to the light confinement layer 21 through an adhesive 214. The optical structure 20 may further include a polycarbonate (PC) layer 215 disposed on a side of the light confinement layer 21 facing the second side S2, and an anti-glare hard coating 216 disposed on the side of the PC layer 215 away from the light confinement layer 21. The display effect of the corresponding display device may be improved.

Figure 23:
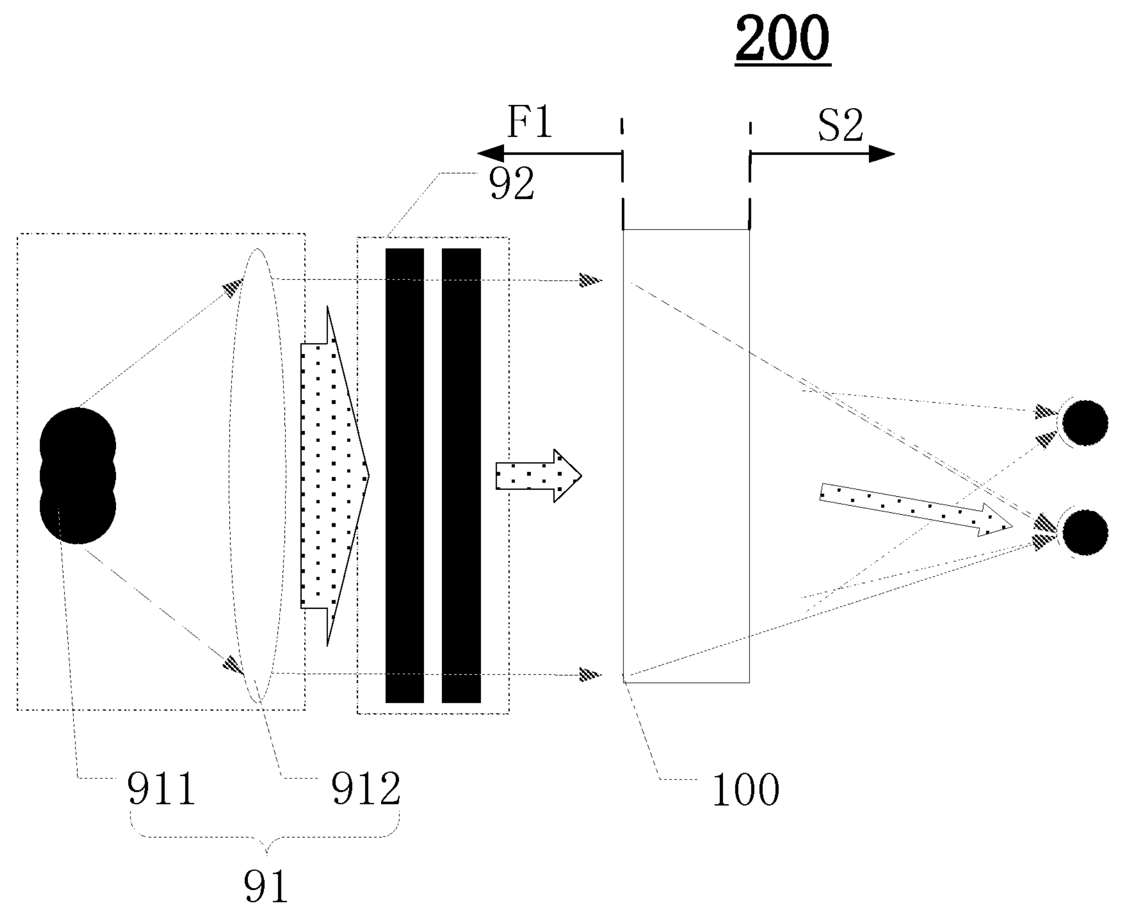
FIG. 23 illustrates an exemplary display device consistent with various disclosed embodiments of the present disclosure.

The present disclosure also provides a display device. As shown in FIG. 23 which is a schematic diagram of a display device 200 provided by one embodiment of the present disclosure, the display device 200 may include a field lens 100 provided by any embodiment of the present disclosure.

In one embodiment, the display device 200 may further include a spatial light modulator 92 and a backlight source 91. The spatial light modulator 92 may be located between the field lens 100 and the backlight source 91.

Specifically, in the present embodiment, the display device 200 may include the field lens 100, the spatial light modulator 92 and the backlight source 91. The spatial light modulator 92 may be arranged between the field lens 100 and the backlight source 91. The backlight source 91 may be a point light source or a laser. The backlight 91 may include a light emitting component 911 (a point light source/laser) and a beam expander collimator assembly 912. The light emitting component 911 may be used to emit display light or display laser. The spatial light modulator 92 may include two LCD (Liquid Crystal Display) panels used for phase modulation and amplitude modulation respectively which are laminated with pixel-level precision, such that the amplitude and phase are adjusted respectively when the incident light passes through the corresponding pixels of the two panels in sequence to achieve holographic display. That is, after the display light is emitted by the light emitting component 911, it may pass through the beam expander collimator assembly 912 and the spatial light modulator 92, enter the field lens 100 from the first side F1 of the field lens 100, and then be emitted from the second side S2. When the emitted display light after passing through the spatial light modulator 92 passes through the field lens 100, the deflection angle of the light may be adjusted, such that the light in different directions may be incident on the user's observation side. The light may be concentrated, and may irradiate on the user's observation side with a continuous manner.

It should be noted, in the above display light or display laser emitted by the light-emitting component 911, both display light and display laser are kinds of electromagnetic wave, but with different wavelengths. The wavelength of laser is shorter than that of light (visible light).

In the present disclosure, the field lens may include the lens body and the optical structure, and the optical structure may be located on the side of at least one grating in the field lens close to the second side of the lens body. The optical structure may block at least part of the visible light incident on the side of the lens body and/or block at least part of the visible light emitted to the second side of the mirror body after being reflected by the grating, to reduce the amount of reflected light emitted to the second side of the mirror body after being reflected by the mirror body. The number of diffraction fringes may be reduced, thereby weakening the effect of diffraction fringes on display effect of the display device.

What is claimed is:

1. A field lens, comprising a lens body and an optical structure, wherein:

the lens body includes at least two layers of bulk holographic gratings, each grating layer disposed on a respective substrate;

along a direction perpendicular to a plane where the lens body is located, the lens body includes a first side and a second side;

the optical structure is located on a side of at least one grating layer close to the second side;

the optical structure is used to block at least part of visible light from being incident on one side of the lens body and/or to block at least part of the visible light from being emitted toward the second side of the lens body after being reflected by the substrates of the gratings; and a minimal expected diffraction angle at which the lens body diffracts the visible light is $\theta$, wherein $\theta$ is a minimum angle among angles formed between diffracted light and a normal line at which diffraction by the lens body occurs, and a maximum allowed exit angle at which the optical structure allows the visible light to exit is $\alpha$, wherein $\alpha$ is the maximum angle among angles at which the optical structure permits light to pass through, and wherein $\alpha<\theta$, such that the optical structure blocks all diffracted visible light emitted toward the second side after reflection by the gratings.

2. The field lens according to claim 1, wherein:

the optical structure includes a light confinement layer;

the light confinement layer includes a plurality of light-shielding components and a plurality of light-transmitting components alternately arranged along a first direction; and the first direction is perpendicular to the direction from the first side to the second side.

3. The field lens according to claim 2, wherein:

spacing between two adjacent light-shielding components is d;

a height of the plurality of light-shielding components along the direction from the first side to the second side is h; and $$\alpha=(1/2)*\arctan(h/d).$$

4. The field lens according to claim 2, wherein:

a plane where at least one of the plurality of light-shielding components is located is perpendicular to a plane where at least one of the gratings is located.

5. The field lens according to claim 1, wherein:

along a direction from the first side to the second side, the lens body includes a pre-deflection grating and a converging grating stacked in layers.

6. The field lens according to claim 5, wherein:

the optical structure is located on a side of the converging grating away from the pre-deflection grating; or the optical structure is located between the converging grating and the pre-deflection grating.

7. The field lens according to claim 5, wherein:

along the direction from the first side to the second side, the converging grating includes a plurality of converging sub-gratings stacked in layers and the pre-deflection grating includes a plurality of pre-deflection sub-gratings stacked in layers, wherein the plurality of converging sub-gratings include a first converging sub-grating, a second converging sub-grating, and a third converging sub-grating, and the plurality of pre-deflection sub-gratings includes a first pre-deflection sub-grating, a second pre-deflection sub-grating, and a third pre-deflection sub-grating;

or along the direction from the first side to the second side, the converging grating includes a plurality of converging sub-gratings stacked in layers, wherein the plurality of converging sub-gratings include a first converging sub-grating, a second converging sub-grating, and a third converging sub-grating; along the direction from the first side to the second side of the lens body, the light that is able to pass through the lens body and the optical structure includes a first color light ray, a second color light ray, and a third color light ray; the first converging sub-grating and the pre-deflection grating are used to deflect the first color light ray; the second converging sub-grating and the pre-deflection grating are used to deflect the second color light ray; and the third converging sub-grating and the pre-deflection grating are used to deflect the third color light ray.

8. The field lens according to claim 7, wherein:

when the converging grating includes the plurality of converging sub-gratings stacked in layers and the pre-deflection grating includes the plurality of pre-deflection sub-gratings stacked in layers, the optical structure is located between two adjacent pre-deflection sub-gratings of the plurality of pre-deflection sub-gratings.

9. The field lens according to claim 7, wherein:

when the converging grating includes the plurality of converging sub-gratings stacked in layers and the pre-deflection grating includes the plurality of pre-deflection sub-gratings stacked in layers, the first converging sub-grating is located on a side of the first pre-deflection sub-grating away from the first side, the second converging sub-grating is located on a side of the second pre-deflection sub-grating away from the first side, and the third converging sub-grating is located on a side of the third pre-deflection sub-grating away from the first side.

10. The field lens according to claim 7, wherein:

when the converging grating includes the plurality of converging sub-gratings stacked in layers and the pre-deflection grating includes the plurality of pre-deflection sub-gratings stacked in layers, the optical structure is located between two adjacent converging sub-gratings of the plurality of converging sub-gratings.

11. The field lens according to claim 7, wherein:

when the converging grating includes the plurality of converging sub-gratings stacked in layers, the pre-deflection grating includes a first pre-deflection sub-grating for deflecting the first color light ray, a second pre-deflection sub-grating for deflecting the second color light ray, and a third pre-deflection sub-grating for deflecting the third color light ray; and along a direction perpendicular to the direction from the first side to the second side, the first pre-deflection sub-grating, the second pre-deflection sub-grating, and the third pre-deflection sub-grating are disposed in a same layer.

12. The field lens according to claim 7, wherein:

a period of the first pre-deflection sub-grating is T1, a period of the second pre-deflection sub-grating is T2, and a period of the third pre-deflection sub-grating is T3, wherein $T1 \neq T2 \neq T3$.

13. The field lens according to claim 1, wherein:

the first side is a functional light incident side, and the second side is a functional light output side.

14. A display device, comprising the field lens according to claim 1.

15. The display device according to claim 14, further comprising a spatial light modulator and a backlight source, wherein:

the spatial light modulator is located between the field lens and the backlight source.

16. A field lens comprising a lens body and an optical structure, wherein:

the lens body includes at least two layers of gratings;

along a direction perpendicular to a plane where the lens body is located, the lens body includes a first side and a second side;

the optical structure is located on a side of at least one grating layer close to the second side;

the optical structure is used to block at least part of visible light from being incident on one side of the lens body and/or to block at least part of the visible light from being emitted toward the second side of the lens body after being reflected by the gratings;

along a direction from the first side to the second side, the lens body includes a pre-deflection grating and a converging grating stacked in layers;

the converging grating includes a plurality of converging sub-gratings stacked in layers and the pre-deflection grating includes a plurality of pre-deflection sub-gratings stacked in layers, the plurality of converging sub-gratings include a first converging sub-grating, a second converging sub-grating, and a third converging sub-grating, the plurality of pre-deflection sub-gratings includes a first pre-deflection sub-grating, a second pre-deflection sub-grating, and a third pre-deflection sub-grating, and along the direction from the first side to the second side of the lens body, light that is able to pass through the lens body and the optical structure includes a first color light ray, a second color light ray, and a third color light ray;

the first converging sub-grating and the first pre-deflection sub-grating are used to deflect the first color light ray;

the second converging sub-grating and the second pre-deflection sub-grating are used to deflect the second color light ray; and the third converging sub-grating and the third pre-deflection sub-grating are used to deflect the third color light ray.

17. A field lens, comprising a lens body and an optical structure, wherein:

the lens body includes at least two layers of bulk holographic gratings, each grating layer disposed on a respective substrate;

along a direction perpendicular to a plane where the lens body is located, the lens body includes a first side and a second side;

the optical structure is located on a side of at least one grating layer close to the second side;

a minimal expected diffraction angle at which the lens body diffracts a first color light ray is $\theta 1$, wherein $\theta 1$ is a minimum angle among angles formed between diffracted first color light and a normal line at which diffraction by the lens body occurs for the first color light ray, and a maximum allowed exit angle at which the optical structure allows the first color light ray to exit is $\alpha 1$, wherein $\alpha 1 < \theta 1$; and a minimum angle at which the lens body diffracts the first color light ray is A1, wherein $\alpha 1 < A1$, such that the optical structure blocks all diffracted first color light emitted toward the second side after reflection by the gratings.

18. The field lens according to claim 17, wherein:

an angle at which the lens body diffracts a second color light ray is $\theta 2$ and an angle at which the optical structure allows the second color light ray to exit is $\alpha 2$, wherein $\alpha 2 < \theta 2$; and a minimum angle at which the lens body diffracts the second color light ray is A2, wherein $\alpha 2 < A2$; and/or an angle at which the lens body diffracts a third color light ray is $\theta 3$ and an angle at which the optical structure allows the third color light ray to exit is $\alpha 3$, wherein $\alpha 3 < \theta 3$; and a minimum angle at which the lens body diffracts the third color light ray is A3, wherein $\alpha 3 < A3$.

19. The field lens according to claim 18, wherein:

the optical structure includes a light confinement layer;

the light confinement layer includes a plurality of light-shielding components and a plurality of light-transmitting components alternately arranged along a first direction; and the first direction is perpendicular to the direction from the first side to the second side.

* * * * *